US012652373B2

(12) United States Patent (10) Patent No.: US 12,652,373 B2
Chen et al. (45) Date of Patent: Jun. 9, 2026

(54) IMAGE PROCESSING METHOD AND APPARATUS, DEVICE, AND MEDIUM

(71) Applicant: TENCENT CLOUD COMPUTING (BEIJING) CO., LTD, Beijing (CN)

(72) Inventors: Mingliang Chen, Beijing (CN); Jun Ouyang, Beijing (CN); Zhicheng Li, Beijing (CN)

(73) Assignee: TENCENT CLOUD COMPUTING (BEIJING) CO., LTD, Beijing (CN)

( * ) Notice: Subject to any disclaimer, the term of this patent is extended or adjusted under 35 U.S.C. 154(b) by 490 days.

(21) Appl. No.: 18/123,577

(22) Filed: Mar. 20, 2023

(65) Prior Publication Data

US 2023/0230215 A1 Jul. 20, 2023

Related U.S. Application Data

(63) Continuation of application No. PCT/CN2021/108468, filed on Jul. 26, 2021.

(30) Foreign Application Priority Data

Apr. 28, 2021 (CN) .......................... 202110468372.7

(51) Int. Cl.
*H04N 9/64* (2023.01)
*G06T 5/00* (2024.01)
(Continued)

(52) U.S. Cl.
CPC ................. *H04N 9/64* (2013.01); *G06T 5/00* (2013.01); *G06T 5/40* (2013.01); *G06T 5/92* (2024.01);
(Continued)

(58) Field of Classification Search
CPC .... G06T 5/00; G06T 5/40; G06T 5/92; G06N 3/0464; G06V 10/42
See application file for complete search history.

(56) References Cited

U.S. PATENT DOCUMENTS 11,776,273 B1 * 10/2023 Chen .................... G06N 3/0464
382/224
2012/0293660 A1 * 11/2012 Murakami ........... G06V 20/586
348/148
(Continued)

FOREIGN PATENT DOCUMENTS

CN 103516989 A 1/2014
CN 109525901 A 3/2019
(Continued)

OTHER PUBLICATIONS

International Search Report PCT/CN2021/108468, mailed Jan. 19, 2022, 5 pages.
(Continued)

*Primary Examiner* — Emily C Terrell
*Assistant Examiner* — Jacqueline R Zak
(74) *Attorney, Agent, or Firm* — ArentFox Schiff LLP

(57) ABSTRACT

An image processing method is provided. In the method, a target video frame set is acquired from video data of a plurality of video frames. The target video frame set includes a subset of the video frames that is selected based on characteristics of the subset of the video frames. A global color feature of a reference video frame is acquired. An image semantic feature of the reference video frame is acquired. An enhancement parameter of the reference video frame is acquired for each of at least one image information dimension according to the global color feature and the image semantic feature. Image enhancement is separately performed on the video frames in the target video frame set according to each enhancement parameter of the reference video frame to obtain target image data for each of the video frames in the target video frame set.

20 Claims, 11 Drawing Sheets

(51) Int. Cl.
　　*G06T 5/40*　　　　(2006.01)
　　*G06T 5/92*　　　　(2024.01)
　　*G06T 7/90*　　　　(2017.01)

(52) U.S. Cl.
　　CPC ...... *G06T 7/90* (2017.01); *G06T 2207/10016*
　　　　(2013.01); *G06T 2207/10024* (2013.01); *G06T*
　　　　　　*2207/20072* (2013.01); *G06T 2207/20081*
　　　　　　(2013.01); *G06T 2207/20084* (2013.01)

(56)　　　　　　References Cited

U.S. PATENT DOCUMENTS

| | | | |
|---|---|---|---|
| 2014/0072284 A1 | 3/2014 | Avrahami et al. | |
| 2018/0270489 A1* | 9/2018 | Maymon | G06T 5/92 |
| 2020/0329217 A1* | 10/2020 | Sun | H04N 5/147 |
| 2021/0112226 A1* | 4/2021 | Abou Shousha | G02B 27/017 |
| 2021/0289186 A1* | 9/2021 | Peng | G06T 5/00 |

| | | | |
|---|---|---|---|
| 2021/0358087 A1* | 11/2021 | Huang | G06T 5/20 |
| 2022/0141455 A1* | 5/2022 | Cricri | H04N 19/176 |
| | | | 375/240.02 |
| 2023/0260155 A1* | 8/2023 | Zhang | G06F 18/24 |
| | | | 348/135 |

FOREIGN PATENT DOCUMENTS

| | | |
|---|---|---|
| CN | 111031346 A | 4/2020 |
| CN | 111583138 A | 8/2020 |

OTHER PUBLICATIONS

Park et al., "Distort-and-Recover: Color Enhancement using Deep Reinforcement Learning," Proceedings of the IEEE Conference on Computer Vision and Pattern Recognition, 2018, pp. 5928-5936, 9 pages.
Written Opinion in PCT/CN2021/108468, mailed Jan. 19, 2022, 4 pages.

* cited by examiner

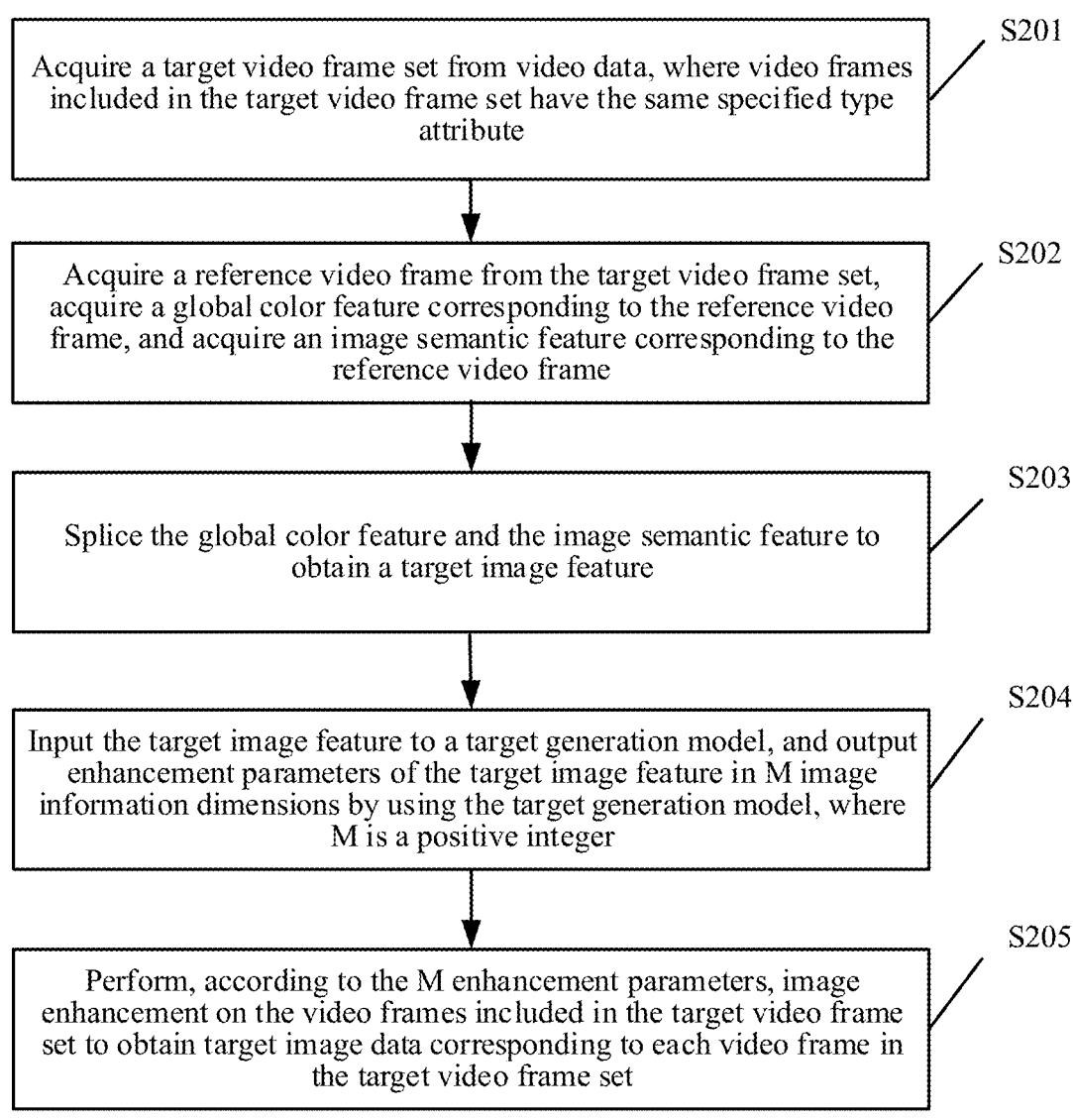

Acquire a target video frame set from video data, where video frames included in the target video frame set have the same specified type attribute

S201

Acquire a reference video frame from the target video frame set, acquire a global color feature corresponding to the reference video frame, and acquire an image semantic feature corresponding to the reference video frame

S202

Splice the global color feature and the image semantic feature to obtain a target image feature

S203

Input the target image feature to a target generation model, and output enhancement parameters of the target image feature in M image information dimensions by using the target generation model, where M is a positive integer

S204

Perform, according to the M enhancement parameters, image enhancement on the video frames included in the target video frame set to obtain target image data corresponding to each video frame in the target video frame set

| Network layer | Output dimension | Computing unit |
| --- | --- | --- |
| First fully connected network layer | 4096 | Fully connected 9280×4096 |
| First activation layer | 4096 | Activation function |
| Second fully connected network layer | 4096 | Fully connected 4096×4096 |
| Second activation layer | 4096 | Activation function |
| Third fully connected network layer | 1024 | Fully connected 4096×1024 |
| Third activation layer | 1024 | Activation function |
| Fourth fully connected network layer | 1 | Fully connected 1024×1 |

FIG. 5

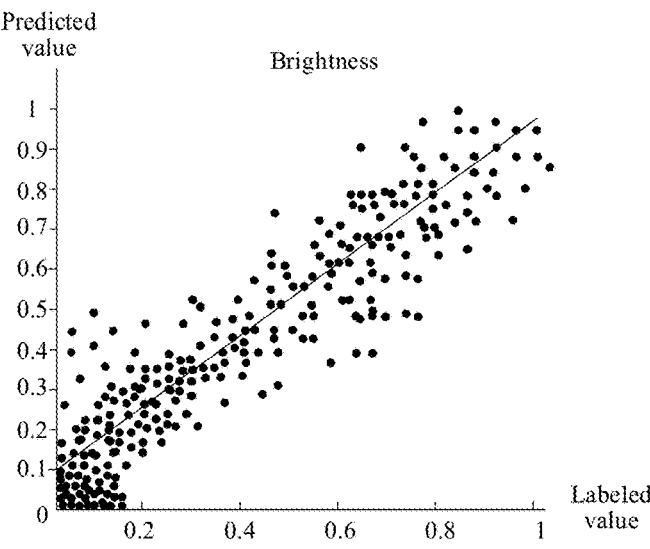
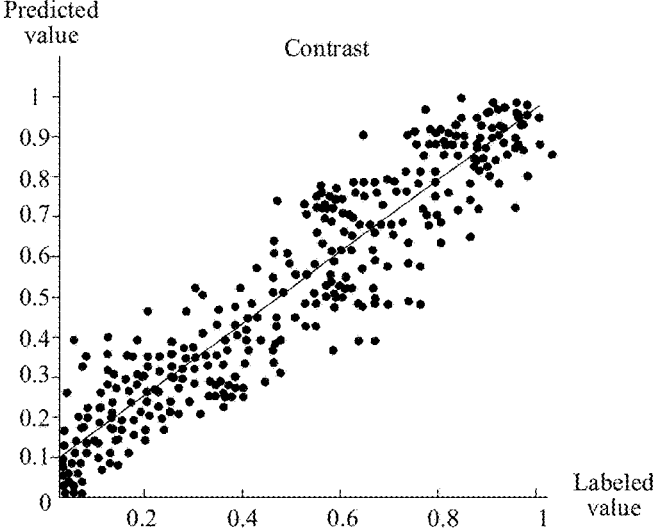
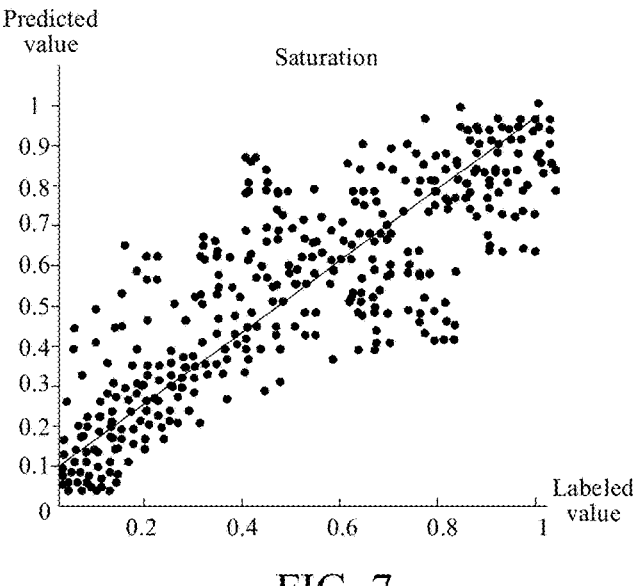
FIG. 7

IMAGE PROCESSING METHOD AND APPARATUS, DEVICE, AND MEDIUM

RELATED APPLICATIONS

This application is a continuation of International Application No. PCT/CN2021/108468, entitled "IMAGE PROCESSING METHOD AND APPARATUS, DEVICE, AND MEDIUM" and filed on Jul. 26, 2021, which claims priority to Chinese Patent Application No. 202110468372.7, entitled "IMAGE PROCESSING METHOD, DEVICE, AND MEDIUM" and filed on Apr. 28, 2021. The entire disclosures of the prior applications are hereby incorporated by reference in their entirety.

FIELD OF THE TECHNOLOGY

This disclosure relates to the field of artificial intelligence technologies, including to an image processing method and apparatus, a device, and a medium.

BACKGROUND OF THE DISCLOSURE

With rapid development and wide application of multimedia technologies and network technologies, the frequency that people use videos/images in their daily life and production activities is increasing. During use of videos/images, users impose higher requirements on quality of the videos/images used.

A color of a video/image may be adjusted by using a deep reinforcement learning method to obtain an image-enhanced video/image, so as to enhance quality of the video/image. However, during color adjustment of a video/image by using the deep reinforcement learning method, adjustment usually needs to be performed repeatedly, leading to low video/image processing efficiency.

SUMMARY

Embodiments of this disclosure include an image processing method and apparatus, a device, and a medium, to improve video data processing efficiency.

According to an aspect, an image processing method is provided. In the method, a target video frame set is acquired from video data of a plurality of video frames. The target video frame set includes a subset of the video frames that is selected based on characteristics of the subset of the video frames. A global color feature of a reference video frame is acquired. The reference video frame is one of the video frames in the target video frame set. An image semantic feature of the reference video frame is acquired. An enhancement parameter of the reference video frame is acquired for each of at least one image information dimension according to the global color feature and the image semantic feature. Image enhancement is separately performed on the video frames in the target video frame set according to each enhancement parameter of the reference video frame to obtain target image data for each of the video frames in the target video frame set.

According to an aspect, an image processing apparatus including processing circuitry is provided. The processing circuitry configured to acquire a target video frame set from video data of a plurality of video frames. The target video frame set includes a subset of the video frames that is selected based on characteristics of the subset of the video frames. The processing circuitry is configured to acquire a global color feature of a reference video frame, the reference video frame being one of the video frames in the target video frame set. The processing circuitry is configured to acquire an image semantic feature of the reference video frame. The processing circuitry is configured to acquire an enhancement parameter of the reference video frame for each of at least one image information dimension according to the global color feature and the image semantic feature. The processing circuitry is configured to separately perform image enhancement on the video frames in the target video frame set according to each enhancement parameter of the reference video frame to obtain target image data for each of the video frames in the target video frame set.

According to an aspect, an embodiment of this disclosure provides a computer device, including a memory and a processor, the memory being connected to the processor, the memory being configured to store a computer program, and the processor being configured to invoke the computer program, so that the computer device performs the foregoing image processing method.

According to an aspect, an embodiment of this disclosure provides a non-transitory computer-readable storage medium storing instructions which when executed by a processor cause the processor to perform the foregoing image processing method.

According to an aspect of this disclosure, a computer program product or a computer program is provided, the computer program product or the computer program including computer instructions, and the computer instructions being stored in a computer-readable storage medium. A processor of a computer device reads the computer instructions from the computer-readable storage medium, and the processor executes the computer instructions, so that the computer device performs the foregoing image processing method.

In an example, a target video frame may be acquired from video data, a reference video frame may be acquired from the target video frame set, enhancement parameters of the reference video frame in M image information dimensions are acquired according to a global color feature and an image semantic feature that correspond to the reference video frame, the enhancement parameters are used as enhancement parameters corresponding to the target video frame set, and image enhancement is separately performed on video frames included in the target video frame set to obtain target image data corresponding to each video frame in the target video frame set. It can be learned that an enhancement parameter needs to be acquired only for one or some of video frames in a video frame set, and the enhancement parameter corresponding to the video frame may be determined as an enhancement parameter of the corresponding video frame set, thereby reducing an amount of computation and improving image enhancement efficiency.

BRIEF DESCRIPTION OF THE DRAWINGS

The following briefly introduces the accompanying drawings for describing exemplary embodiments of the disclosure. The accompanying drawings in the following description show merely some embodiments of this disclosure. Other embodiments are within the scope of this disclosure.

FIG. 4 is a schematic diagram of a time sequence of an image processing method according to an embodiment of this disclosure.

FIG. 5 is a schematic structural diagram of a regression network in a target generation model according to an embodiment of this disclosure.

FIG. 7 is a schematic diagram of a predicted enhancement parameter corresponding to a target generation model according to an embodiment of this disclosure.

DESCRIPTION OF EMBODIMENTS

Technical solutions in embodiments of this disclosure are described in the following with reference to the accompanying drawings in the embodiments of this disclosure. The described embodiments are merely some rather than all of the embodiments of this disclosure. Other embodiments are within the scope of this disclosure.

This disclosure includes embodiments related to an artificial intelligence (AI) technology, a block chain technology, and a cloud technology. This disclosure further includes embodiments related to image processing that belongs to computer vision. For example, an enhancement parameter corresponding to a video frame is acquired, and image enhancement is performed on video data according to the enhancement parameter, to obtain target image data corresponding to the video data and improve enhancement quality corresponding to the video data.

This disclosure includes embodiments relating to an artificial intelligence cloud service that belongs to the cloud technology. In this disclosure, one or more image enhancement cloud services provided by a platform may be accessed and used through an application programming interface (API), and image enhancement is performed on video data by using the one or more image enhancement cloud services.

This disclosure including embodiments relating to cloud storage that belongs to the cloud technology. In this disclosure, video data corresponding to different clients may be separately stored in different logical volumes, that is, video data of different clients may be stored in a file system. For video data corresponding to any client, the file system may divide the video data into a plurality of parts, that is, the video data is divided into a plurality of video frame sets. Each part is an object. The object may not only include a video frame, but also include a frame code corresponding to the video frame, a photographing time or a rendering time corresponding to the video frame, and the like.

In this disclosure, video data and target image data corresponding to the video data may be stored in a block chain, to avoid unauthorized tampering of the video data and the target image data corresponding to the video data, so as to improve data security.

Figure 1:
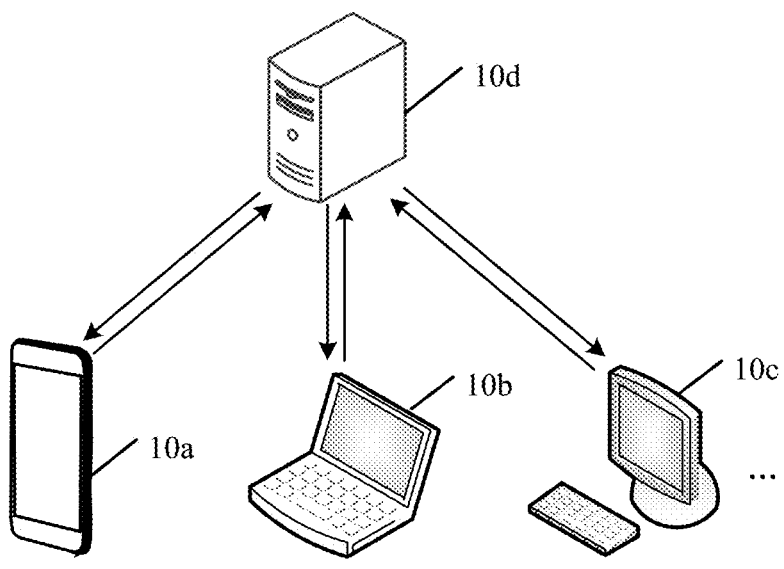
FIG. 1 is a schematic structural diagram of a network architecture according to an embodiment of this disclosure.

FIG. 1 is a schematic structural diagram of a network architecture according to an embodiment of this disclosure.

As shown in FIG. 1, the network architecture may include a server 10d and a user terminal cluster. The user terminal cluster may include one or more user terminals. A quantity of user terminals is not limited herein. As shown in FIG. 1, the user terminal cluster may include a user terminal 10a, a user terminal 10b, a user terminal 10c, and the like. The server 10d may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. As shown in FIG. 1, the user terminal 10a, the user terminal 10b, the user terminal 10c, and the like each may establish a network connection to the server 10d, so that each user terminal can exchange data with the server 10d through the network connection.

For ease of understanding, in this embodiment of this disclosure, a user terminal may be selected from the user terminal cluster shown in FIG. 1 as a target user terminal. For example, in this embodiment of this disclosure, the user terminal 10a shown in FIG. 1 may serve as a target user terminal. The target user terminal may be integrated with an application client having an image processing function. For example, the user terminal 10a may acquire video data, such as short video data and live data, by using a camera device, and transmit the video data to the server 10d. After receiving the video data transmitted by the target user terminal 10a, the server 10d may acquire a global color feature and an image semantic feature that correspond to a reference video frame in the video data, acquire, according to the global color feature and the image semantic feature, an enhancement parameter corresponding to the reference video frame, and perform image enhancement on the reference video frame according to the enhancement parameter, to obtain target image data corresponding to the reference video frame. In this way, color enhancement is performed on a video frame in the video data, to improve a display effect of the video frame, improve visual experience of a user, and also image enhancement efficiency.

Figure 2:
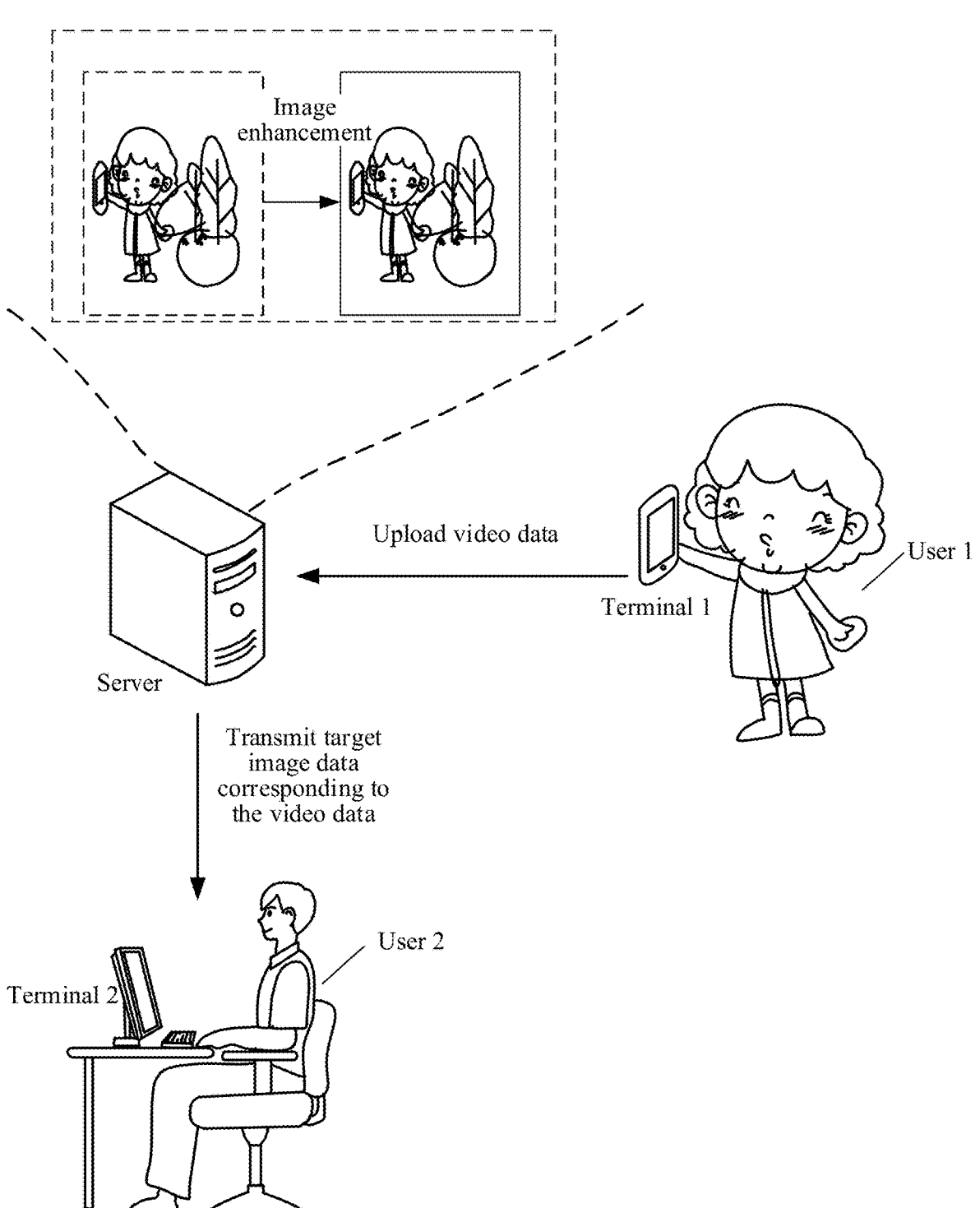
FIG. 2 is a schematic diagram of an image enhancement scenario according to an embodiment of this disclosure.

FIG. 2 is a diagram of an image enhancement scenario according to an embodiment of this disclosure. As shown in FIG. 2, a terminal 1 may be a client that has an image enhancement permission and that is integrated in the user terminal 10a shown in FIG. 1, a terminal 2 may be a client that has an image enhancement permission and that is integrated in the user terminal 10b shown in FIG. 1, and a service device may be the server 10d shown in FIG. 1. As shown in FIG. 2, a user 1 may perform livestreaming by using the terminal 1, and the terminal 1 may capture a behavior and an action of the user by using a camera device configured in the terminal 1, to obtain video data corresponding to the user 1, and transmit, to the server, the video data corresponding to the user 1. The server may receive the video data that corresponds to the user 1 and that is transmitted by the terminal 1, and divide and process the video data to obtain N video frame sets. N is a positive integer. For example, N may be 1, 2, or 3. For ease of understanding, a target video frame set in the N video frame sets is used as an example. The target video frame set is any one of the N video frame sets. The server may acquire a global color feature and an image semantic feature that correspond to a reference video frame in the target video frame set, and acquire an enhancement parameter of the reference video frame according to the global color feature and the image semantic feature, and then may perform image enhancement on the reference video frame according to the enhancement parameter, to obtain target image data corresponding to the reference video frame, so as to improve image quality corresponding to the reference video frame. In addition, the server may further use the enhancement parameter of the reference video frame as an enhancement parameter corresponding to the target video frame set, and perform image enhancement on a video frame in the target video frame set according to the enhancement parameter, to obtain target image data corresponding to the target video frame set. In this way, target image data corresponding to the video data is acquired. After obtaining the target image data corresponding to the video data, the server may transmit the target image data to the terminal 2, and a user 2 may watch, on the terminal 2, the target image data corresponding to the user 1. As shown in FIG. 2, after the terminal 1 obtains the video data corresponding to the user 1 through photographing, a display effect corresponding to the video data obtained through photographing is poor (for example, dim light or overexposure) due to impact of factors such as light and balance during photographing by the user 1, leading to poor visual experience of a user. Therefore, the server performs image enhancement on the video data of the user 1, and transmits image-enhanced target video data to a user who wants to watch the video data (for example, the user 2), so as to improve enhancement quality of the video data and improve visual experience of the user. In addition, in this disclosure, image enhancement efficiency can also be improved.

Figure 3:
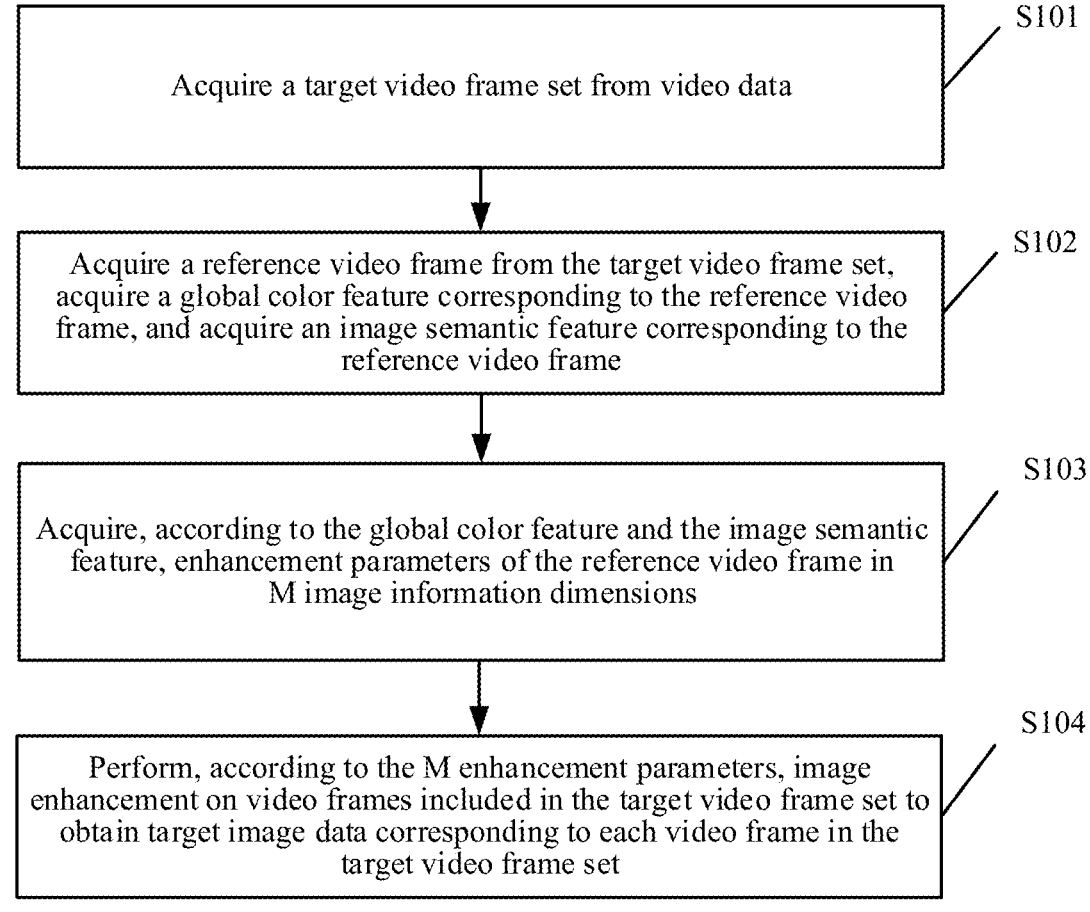
FIG. 3 is a schematic diagram of a time sequence of an image processing method according to an embodiment of this disclosure.

FIG. 3 is a schematic diagram of a time sequence of an image processing method according to an embodiment of this disclosure. It may be understood that the image processing method may be performed by a client and a service device through interaction. The client may be a client integrated in any user terminal in the user terminal cluster shown in FIG. 1. The service device may be an independent server (for example, the server 10d shown in FIG. 1), a server cluster including a plurality of servers, a user terminal, or the like. As shown in FIG. 3, the image processing method may include the following steps:

In step S101, a target video frame set is acquired from video data.

In an example, a target video frame set is acquired from video data of a plurality of video frames. The target video frame set includes a subset of the video frames that is selected based on characteristics of the subset of the video frames.

For example, video data obtained through photographing inevitably has problems such as overexposure or dim light due to improper operations performed by a user during video recording. Therefore, after a user obtains user video data (for example, a makeup video or a short life video) through photographing, image processing (for example, image enhancement) may be performed on the user video data obtained through photographing, to improve a display effect corresponding to the user video data. In this embodiment of this disclosure, after acquiring the video data (for example, receiving video data uploaded by a user, and determining the video data uploaded by the user as the video data), the computer device may acquire the target video frame set from the video data. The target video frame set is any video frame set in one or more video frame sets in the video data. Video frames included in the target video frame set have the same specified type attribute. For example, the specified type attribute may include a scene attribute. For example, video frames in the same video frame set belong to the same scene, that is, scene images corresponding to video frames in the same video frame set are similar.

In an example, a manner of acquiring, by the computer device, the target video frame set from the video data may include: acquiring the video data, and dividing the video data into L video frames; acquiring a color histogram corresponding to each of the L video frames, where L is a positive integer, for example, a value of L may be 1, 2, 3, . . . , and in an example, L is a positive integer greater than or equal to 2; acquiring a similarity distance between every two adjacent video frames in the L video frames according to the color histogram corresponding to each of the L video frames, where the similarity distance may indicate a similarity between two video frames, for example, the similarity distance may be a Euclidean distance or a cosine distance between two video frames, for example, the L video frames include a video frame $T_i$ and a video frame $T_{i+1}$ that are adjacent, and a similarity distance between the video frame $T_i$ and the video frame $T_{i+1}$ is acquired according to a color histogram corresponding to each of the video frame $T_i$ and the video frame $T_{i+1}$, where is a positive integer less than L, for example, a value of i may be 1, 2, 3, . . . ; dividing the L video frames according to the similarity distance to obtain N video frame sets, where a similarity distance between two adjacent video frames in each video frame set is less than a distance threshold, and N is a positive integer, for example, a value of N may be 1, 2, 3, . . . ; and selecting any video frame set from the N video frame sets as the target video frame set.

For example, after acquiring the video data, the computer device may divide the video data into L video frames, and acquire a color histogram corresponding to each of the L video frames. For ease of understanding, a video frame $T_i$ and a video frame $T_{i+1}$ that are adjacent in the L video frames are used as examples. After obtaining a color histogram corresponding to each of the video frame $T_i$ and the video frame $T_{1+1}$, the computer device may compare color histograms respectively corresponding to the video frame $T_i$ and the video frame $T_{1+1}$, to obtain a similarity distance between the video frame $T_i$ and the video frame $T_{1+1}$. The L video frames in the video data are divided according to the similarity distance and a sequence (for example, a photographing time sequence or a rendering time sequence) corresponding to video frames in the L video frames, to obtain N video frame sets, where a similarity distance between every two adjacent video frames in the target video frame set is less than a distance threshold, and any video frame set is selected from the N video frame sets as the target video frame set.

For example, the L video frames include four video frames whose photographing times are continuous: a video frame $T_1$, a video frame $T_2$, a video frame $T_3$, and a video frame $T_4$. A color histogram corresponding to each of the video frame $T_1$, the video frame $T_2$, the video frame $T_3$, and the video frame $T_4$ may be acquired. A similarity distance between adjacent video frames may be calculated according to a sequence of photographing times and color histograms of the video frames. For example, a similarity distance between the video frame $T_1$ and the video frame $T_2$ is calculated according to a color histogram corresponding to each of the video frame $T_1$ and the video frame $T_2$. If the similarity distance between the video frame $T_1$ and the video frame $T_2$ is less than the distance threshold, the video frame $T_1$ and the video frame $T_2$ are divided into the same video frame set. If the similarity distance between the video frame $T_1$ and the video frame $T_2$ is greater than or equal to the distance threshold, the video frame $T_1$ and the video frame $T_2$ are divided into different video frame sets. After the division of the video frame $T_1$ and the video frame $T_2$, a distance threshold (or similarity distance threshold) between the video frame $T_2$ and the video frame $T_3$ may be calculated according to a color histogram corresponding to each of the video frame $T_2$ and the video frame $T_3$. Similarly, if the similarity distance between the video frame $T_2$ and the video frame $T_3$ is less than the distance threshold, the video frame $T_2$ and the video frame $T_3$ are divided into the same video frame set. If the similarity distance between the video frame $T_2$ and the video frame $T_3$ is greater than or equal to the distance threshold, the video frame $T_2$ and the video frame $T_3$ are divided into different video frame sets. When a similarity distance between any adjacent video frames of the video frame $T_1$, the video frame $T_2$, the video frame $T_3$, and the video frame $T_4$ is less than the distance threshold, the video frame $T_1$, the video frame $T_2$, the video frame $T_3$, and the video frame $T_4$ may be divided into the same video frame set. In this way, the L video frames are divided to obtain N video frame sets. After the video data is divided into the N video frame sets, image processing is performed on a video frame in each video frame set, to avoid obvious color transition and improve an image enhancement effect, so as to improve visual experience of a user.

In an example, a manner of acquiring, by the computer device, the color histogram corresponding to each of the L video frames may include: dividing a color space into P image color ranges, and acquiring a first video frame (for example, the video frame $T_i$) from the L video frames, where P is a positive integer, for example, a value of P may be 1, 2, 3, . . . ; counting, according to a color space to which pixels in the first video frame belong, a pixel quantity of pixels included in each of the P image color ranges; and generating, according to the pixel quantity corresponding to each of the P image color ranges, a color histogram corresponding to the first video frame.

For example, the computer device may divide a color space into P image color ranges. A color histogram includes a plurality of bins. Each image color range is a bin in the color histogram. A height of each bin is used to indicate a quantity of pixels, in an image, that fall within an image color range corresponding to the bin. A video frame $T_i$ is used as an example. The video frame $T_i$ is acquired from the L video frames. A quantity of pixels included in each image color range is counted according to a color space to which pixels in the video frame $T_i$ belong, that is, the pixels in the video frame $T_i$ are divided into image color ranges, and a quantity of pixels, of the pixels in the video frame $T_i$, that fall within each image color range. A height of a bin corresponding to each of the P image color ranges is determined according to a quantity of pixels corresponding to each of the P image color ranges, and a color histogram corresponding to the video frame $T_i$ is generated. In this way, a color histogram corresponding to each of the L video frame is obtained. The color histogram may be a histogram created based on a hue, saturation, value (HSV) color space, an Luv color space (CIELUV), or a Lab color space (CIELAB). The HSV color space is a color space created according to intuitive characteristics of a color. Parameters of the HSV color space are hue (H), saturation (S), and value (V). In the Luv color space, L indicates luminance of an object, and u and v indicate chrominance. The Luv color space is obtained through simple transformation of an image space, and has visual unity. The Lab color space describes visual perception of humans by using a digital method. In the Lab color space, the L component is used to indicate luminance of a pixel, and a value range is [0, 100], which indicates pure black to pure white; a indicates a range from red to green, and a value range is [127, —128]; b indicates a range from yellow to blue, and a value range is [127, —128]. For example, in this disclosure, the color histogram corresponding to each of the L video frame may be generated based on the Lab color space.

In step S102, a reference video frame is acquired from the target video frame set, a global color feature corresponding to the reference video frame is acquired, and an image semantic feature corresponding to the reference video frame is acquired.

In an example, a global color feature of a reference video frame is acquired. The reference video frame is one of the video frames in the target video frame set. An image semantic feature of the reference video frame is acquired.

For example, the computer device may acquire a reference video frame from the target video frame set, where the reference video frame is any video frame in the target video frame set. For example, one or more video frames are randomly selected from the target video frame set as one or more reference video frames. The computer device may acquire a global color feature corresponding to the reference video frame, where the global color feature may refer to a feature that can represent a whole image, for example, the global color feature may be used to describe an overall feature such as a color and a shape of an image or a target; and acquire an image semantic feature corresponding to the reference video frame.

In an example, a manner of acquiring, by the computer device, the global color feature corresponding to the reference video frame may include: adjusting a size of the reference video frame to obtain a candidate video frame with a target size, and acquiring, according to a color histogram corresponding to the candidate video frame, the global color feature corresponding to the reference video frame.

In an example, a manner of acquiring the image semantic feature corresponding to the reference video frame may include: performing a convolution operation on the reference video frame by using a convolutional layer in a feature extraction model, to obtain an image convolution feature corresponding to the reference video frame; and performing a residual operation on the image convolution feature by using a residual layer in the feature extraction model, to obtain the image semantic feature corresponding to the reference video frame. The computer device may directly input the reference video frame to the feature extraction model, or may input the candidate video frame to the feature extraction model. For example, the candidate video frame is input to the feature extraction model; a convolution operation is performed on the candidate video frame according to the convolutional layer in the feature extraction model, to obtain an image convolution feature corresponding to the candidate video frame; and a residual operation is performed on the image convolution feature according to the residual layer in the feature extraction model, to obtain the image semantic feature corresponding to the reference video frame. A color histogram corresponding to the candidate video frame may also be any histogram obtained based on the HSV color space, the Luv color space, or the Lab color space, that is, the color histogram corresponding to the candidate video frame may be a histogram obtained based on the HSV color space, or may be a histogram obtained based on the Luv color space, or may be a histogram obtained based on the Lab color space. This is not limited in this embodiment of this disclosure.

For example, the computer device may first adjust the size of the reference video frame, for example, may adjust the size of the reference video frame to a small size, for example, 224×224, and then perform feature extraction on the reference video frame, to improve operation efficiency. After obtaining the candidate video frame with the target size, the computer device may acquire a color histogram corresponding to the candidate video frame, for example, may acquire, based on the Lab color space, the color histogram corresponding to the candidate video frame, and extract, according to the color histogram corresponding to the candidate video frame, a global color feature corresponding to the candidate video frame. During the extracting, according to the color histogram corresponding to the candidate video frame, a global color feature corresponding to the candidate video frame, feature extraction may be performed, by using a color feature extraction network, the color histogram corresponding to the candidate video frame. Each channel in the color feature extraction network may have 20 bins and a total of 8000 (20×20×20) dimensions. In an example, when acquiring the color histogram corresponding to the candidate video frame, the computer device may acquire, according to the foregoing method for acquiring the color histogram corresponding to each of the L video frames in the video data, the color histogram corresponding to the candidate video frame, and acquire, according to the color histogram, the global color feature corresponding to the reference video frame. In an example, a color histogram corresponding to each video frame in the video data has been obtained when the video data is divided to obtain the N video frame sets, and a to-be-processed video also belongs to the video data. Therefore, during the division of the video data, the color histogram corresponding to each video frame in the video data may be stored according to a video frame identifier. In this way, during the acquisition of the color histogram corresponding to the candidate video frame, a color histogram corresponding to a corresponding video frame may be directly acquired from a corresponding database as the color histogram corresponding to the candidate video frame.

For example, when acquiring the image semantic feature corresponding to the reference video frame, the computer device may input the candidate video frame to the feature extraction model, where the feature extraction model may be a lightweight convolutional neural network, and a quantity of parameters can be reduced in the lightweight convolutional neural network, thereby reducing an amount of computation. The computer device performs a convolution operation on the candidate video frame according to the convolutional layer in the feature extraction model, to obtain an image convolution feature corresponding to the candidate video frame; and perform, according to the residual layer in the feature extraction model, a residual operation on the image convolution feature corresponding to the candidate video frame, to obtain the image semantic feature corresponding to the reference video frame. The feature extraction model may be MobileNetV1 (a lightweight model), MobileNetV2 (a lightweight model), a residual network (ResNet), or the like. In this embodiment of this disclosure, the MobileNetV2 is used as an example for describing a feature extraction process of the reference video frame in detail. In the MobileNetV2, depthwise separable convolution 3×3conv is used, and an amount of computation is much smaller than that of standard convolution. Therefore, to extract more features, in the MobileNetV2, 1×1conv is first used to increase a quantity of channels, and then 1×1conv is used to reduce a quantity of channels, to form a block that is small at both ends and large in the middle (that is, an inverted residual block), which is opposite to a residual block. When the MobileNetV2 is used to acquire the image semantic feature corresponding to the reference video frame, an output image feature of an upper layer of a fully connected classification layer in the MobileNetV2 may be used as the image semantic feature corresponding to the reference video frame. That is, if the upper layer of the fully connected classification layer in the MobileNetV2 is an inverted residual layer V, an output image feature of the inverted residual layer V is determined as the image semantic feature corresponding to the reference video frame. When the MobileNetV2 is used to extract the image semantic feature of the reference video frame, in a network structure of the MobileNetV2, the foregoing inverted residual block may be used to perform feature extraction on the reference video frame. This can reduce an amount of computation, and the image semantic feature corresponding to the reference video frame can be obtained with less computation, thereby improving feature extraction efficiency.

In step S103, according to the global color feature and the image semantic feature, enhancement parameters of the reference video frame in M image information dimensions are acquired.

In an example, an enhancement parameter of the reference video frame is acquired for each of at least one image information dimension according to the global color feature and the image semantic feature.

For example, after acquiring the global color feature and the image semantic feature that correspond to the reference video frame, the computer device may perform feature fusion and extraction on the global color feature and the image semantic feature; determine image attribute information corresponding to the reference video frame, such as image chrominance information, image brightness information, image contrast information, and image saturation information; determine whether the image attribute information is within a normal threshold; if the image attribute information is not within the normal threshold, acquire a difference between the image attribute information corresponding to the reference video frame and the normal threshold; determine, according to the difference, an enhancement parameter corresponding to the reference video frame, for example, determine the enhancement parameters of the reference video frame in the M image information dimensions, where the image information dimensions may include at least one of dimensions such as a brightness information dimension, a contrast information dimension, and a saturation information dimension; and adjust the reference video frame according to the enhancement parameter, and adjust image attribute information that is not within the normal threshold, so that adjusted image attribute information is within the normal threshold. If the image brightness information exceeds a normal brightness range (for example, overexposure occurs), image brightness may be reduced according to a corresponding enhancement parameter; or if the image brightness information is lower than a normal brightness range (for example, light is dim), image brightness may be increased according to a corresponding enhancement parameter.

In step S104, perform, according to the M enhancement parameters, image enhancement on the video frames included in the target video frame set to obtain target image data corresponding to each video frame in the target video frame set.

In an example, image enhancement is separately performed on the video frames in the target video frame set according to each enhancement parameter of the reference video frame to obtain target image data for each of the video frames in the target video frame set.

For example, after acquiring the enhancement parameters of the reference video frame in the M image information dimensions, the computer device may perform, according to the M enhancement parameters, image enhancement on the video frames included in the target video frame set to obtain target image data corresponding to each video frame in the target video frame set, where M is a positive integer, for example, a value of M may be 1, 2, 3, . . . . For example, the M enhancement parameters may include at least one of a brightness enhancement parameter, a contrast enhancement parameter, and a saturation enhancement parameter. Therefore, image enhancement may be performed on each video frame in the target video frame set according to at least one of the brightness enhancement parameter, the contrast enhancement parameter, and the saturation enhancement parameter, to obtain the target image data corresponding to each video frame in the target video frame set. For example, a video frame i in the target video frame set is used as an example for interpretation, where i is a positive integer, for example, a value of i may be 1, 2, 3, . . . . The video frame i refers to any video frame in the target video frame set. Brightness of the video frame i is adjusted according to the brightness enhancement parameter, to obtain a brightness-enhanced video frame i. In this case, brightness of the brightness-enhanced video frame i is within a normal threshold range. Contrast of the brightness-enhanced video frame i is adjusted according to the contrast enhancement parameter, to obtain a contrast-adjusted video frame i. In this case, brightness and contrast that correspond to the contrast-adjusted video frame i are both within a normal threshold range. Saturation of the contrast-adjusted video frame i is adjusted according to the saturation enhancement parameter, to obtain a saturation-adjusted video frame i. In this case, brightness, contrast, and saturation that correspond to the video frame i are all within a normal threshold range. Then target image data corresponding to the video frame i is determined based on the saturation-adjusted video frame i.

Video frames in each video frame set in the video data have the same specified type attribute (for example, the video frames in each video frame set belong to the same scene). Therefore, a video frame may be randomly selected from the target video frame set as the reference video frame. After enhancement parameter extraction is performed on the reference video frame to obtain the enhancement parameters of the reference video frame in the M image information dimensions, the enhancement parameters of the reference video frame in the M image information dimensions may be determined as enhancement parameters of the target video frame set in the M image information dimensions. Image enhancement may be performed on each video frame in the target video frame set according to the enhancement parameters in the M image information dimensions, to obtain target image data corresponding to each video frame in the target video frame set. In this way, an enhancement parameter corresponding to each video frame set in the video data is acquired. Further, target image data corresponding to each video frame of the reference video frame is acquired according to the enhancement parameter corresponding to each video frame set. In this way, the same set of enhancement parameters are used for video frames in the same video frame set. This can avoid visible color transition between video frames in the same scene. In addition, enhancement parameter prediction needs to be performed only once for one video frame set, thereby greatly reducing an amount of computation in video application and improving image processing efficiency.

In an example, after the computer device acquires the enhancement parameter corresponding to each video frame set in the video data, the computer device may perform threshold processing on the enhancement parameter corresponding to each video frame set, so that the enhancement parameter corresponding to each video frame set does not exceed an enhancement threshold. Different video frame sets or different application scenarios correspond to different enhancement thresholds. This can avoid serious color transition between video frames, and improve a display effect of the target image data, so as to improve visual experience of a user. The enhancement threshold corresponding to the enhancement parameter may be defined according to a specific situation. This is not limited in this embodiment of this disclosure. In addition, in this embodiment of this disclosure, a lookup table (LUT) algorithm may be further used for optimization when image enhancement is performed on each video frame in the video data. The LUT algorithm may write data into a random access memory (RAM) in advance. Inputting a signal is equivalent to inputting an address for table lookup, and content corresponding to the address is found and then outputted. There is actually a mapping table of pixel grayscale values. An actually sampled pixel grayscale value undergoes specific transformation (for example, threshold transformation, inversion, binarization, or contrast adjustment), and is programmed into another grayscale value corresponding to the pixel grayscale value. This can highlight useful information of an image, thereby enhancing the image. Pixel values of each channel in an image have only 255 integer values. Therefore, the 255 values corresponding to the image may be calculated in advance and stored in a default threshold table. In this way, a rapid search can be directly performed in the threshold table during image enhancement of a video frame. This is much more efficient than performing the same repeated computation for each pixel, thereby improving image enhancement efficiency.

In this embodiment of this disclosure, the video data may be divided according to the color histogram corresponding to each video frame, to obtain the N video frame sets, where video frames included in each video frame set have the same attribute information. This can ensure consistency of the division of the video data, that is, ensure that video frames included in each video frame set have the same specified type attribute (for example, all video frames in the same video frame set belong to the same scene image). In this way, during acquisition of an enhancement parameter of each video frame set, a video frame may be directly randomly acquired from each video frame set as a reference video frame, enhancement parameters of the reference video frame in M image information dimensions are acquired according to a global color feature and an image semantic feature that correspond to the reference video frame, the enhancement parameters are used as enhancement parameters corresponding to a corresponding video frame set, and image enhancement is separately performed on video frames included in the video frame set to obtain target image data corresponding to each video frame in each video frame set. It can be learned that an enhancement parameter needs to be acquired only for one video frame in a video frame set, and the enhancement parameter corresponding to the video frame may be determined as an enhancement parameter of the corresponding video frame set, thereby reducing an amount of computation and improving image enhancement efficiency. In addition, the same set of enhancement parameters may be used for video frames having the same attribute. This can reduce a risk of color transition of an image, thereby improving enhancement quality of video data.

FIG. 4 is a schematic diagram of a time sequence of an image processing method according to an embodiment of this disclosure. It may be understood that the image processing method may be performed by a client and a service device through interaction. The client may be a client integrated in any user terminal in the user terminal cluster shown in FIG. 1. The service device may be an independent server (for example, the server 10d shown in FIG. 1), a server cluster including a plurality of servers, a user terminal, or the like. As shown in FIG. 4, the image processing method may include the following steps:

In step S201, acquire a target video frame set from video data, where video frames included in the target video frame set have the same specified type attribute.

In step S202, acquire a reference video frame from the target video frame set, acquire a global color feature corresponding to the reference video frame, and acquire an image semantic feature corresponding to the reference video frame.

For an example of content of step S201 and step S202, refer to the content of step S101 and step S102 in FIG. 3. Details are not described herein again in this embodiment of this disclosure.

In step S203, splice the global color feature and the image semantic feature to obtain a target image feature.

For example, after acquiring the global color feature and the image semantic feature that correspond to the reference video frame, the computer device may splice the global color feature and the image semantic feature to obtain the target image feature. For example, a global color feature extracted by using a Lab color histogram has a total of 8000 dimensions, and an image semantic feature extracted by using MobileNetV2 has 1280 dimensions. After the global color feature and the image semantic feature are spliced, a 9280-dimensional target image feature may be generated.

In step S204, input the target image feature to a target generation model, and output enhancement parameters of the target image feature in M image information dimensions by using the target generation model, where M is a positive integer.

For example, after obtaining the target image feature corresponding to the reference video frame, the computer device may input the target image feature to the target generation model, process (that is, perform feature extraction on) the target image by using the target generation model, and output the enhancement parameters of the reference video frame in the M image information dimensions. The target generation model may include M regression networks. The regression network may be a fully connected regression network. A quantity of regression networks in the target generation model may be determined according to a quantity of M image information dimensions that need to be predicted. One image information dimension corresponds to one regression network, that is, one regression network is used to predict an enhancement parameter in one image information dimension.

In an example, the enhancement parameters in the M image information dimensions include at least one of a brightness enhancement parameter, a contrast enhancement parameter, and a saturation enhancement parameter. A manner of outputting, by the computer device, the enhancement parameters of the target image feature in the M image information dimensions by using the target generation model may include: in response to that the enhancement parameters in the M image information dimensions include the brightness enhancement parameter, inputting the target image feature to the target generation model, and weighting the target image feature by using a weight matrix corresponding to a first regression network in the target generation model, to obtain a brightness enhancement parameter corresponding to the reference video frame; in response to that the enhancement parameters in the M image information dimensions include the contrast enhancement parameter, weighting the target image feature by using a weight matrix corresponding to a second regression network in the target generation model, to obtain a contrast enhancement parameter corresponding to the reference video frame; and in response to that the enhancement parameters in the M image information dimensions include the saturation enhancement parameter, weighting the target image feature by using a weight matrix corresponding to a third regression network in the target generation model, to obtain a saturation enhancement parameter corresponding to the reference video frame.

For example, each regression network in the target generation model may include one or more fully connected layers. The fully connected layer may be followed by an activation function layer. The activation function layer may be used to perform nonlinear combination on output features of the fully connected layer, to enhance the output features outputted by the fully connected layer. When the regression network includes one fully connected layer, the fully connected layer may be allowed by one activation function layer. In this case, parameters of the fully connected layer and the activation function layer may be referred to as a weight matrix corresponding to the regression network, and an output result of the activation function layer may be used as an output result of the regression network. When the regression network includes a plurality of fully connected layers, the fully connected layers and activation function layers may be connected alternately, that is, one fully connected layer is followed by one activation function layer. In an example, the last fully connected layer may be used as an output layer of the regression network, that is, the last fully connected layer of the regression network does not need to be followed by an activation function layer. Parameters of all fully connected layers and activation function layers included in the regression network may be referred to as a weight matrix of the regression network. The computer device may input the target image feature to the target generation model, and weight the target image feature according to a weight matrix corresponding to a first regression network in the target generation model, to obtain a brightness enhancement parameter corresponding to the reference video frame; weight the target image feature according to a weight matrix corresponding to a second regression network in the target generation model, to obtain a contrast enhancement parameter corresponding to the reference video frame; and weight the target image feature according to a weight matrix corresponding to a third regression network in the target generation model, to obtain a saturation enhancement parameter corresponding to the reference video frame. The M regression networks included in the target generation model may be respectively used to predict enhancement parameters in different image information dimensions. The M regression networks may have the same network structure, but weight matrices (network parameters) corresponding to the M regression networks are different.

FIG. 5 is a schematic structural diagram of a regression network in a target generation model according to an embodiment of this disclosure. As shown in FIG. 5, brightness, contrast, and saturation of an image are correlated. Therefore, enhancement parameters of a reference video frame in a contrast information dimension, a brightness information dimension, and a saturation information dimension may be predicted by using the target generation model. In this case, the target generation model may include regression networks respectively corresponding to the contrast information dimension, the brightness information dimension, and the saturation information dimension: a first regression network, which may be used to predict an enhancement parameter of the reference video frame in the brightness information dimension; a second regression network, used to predict an enhancement parameter of the reference video frame in the contrast information dimension; and a third regression network, used to predict an enhancement parameter of the reference video frame in the saturation information dimension. In an example, it is assumed that the first regression network, the second regression network, and the third regression network each may include four fully connected layers and three activation function layers (the last fully connected layer may be used as an output layer of the regression network). Structural content of each regression network may be shown in FIG. 5. Each regression network may include a first fully connected network layer, a second fully connected network layer, and a third fully connected network layer. As shown in FIG. 5, the first fully connected network layer has 4096 output dimensions and 9280×4096 fully connected computing units. The first fully connected network layer is followed by a first activation layer, that is, a rectified linear unit (ReLU, which is an activation layer commonly used in an artificial neural network) activation layer. The ReLU activation layer has 4096 output dimensions. An image feature outputted by the first fully connected network layer is activated by using an ReLU activation function in the ReLU activation layer to enhance the image feature outputted by the first fully connected network layer. The second fully connected network layer has 4096 output dimensions and 4096×4096 fully connected computing units. The second fully connected network layer is also followed by a second activation layer. The second activation layer has the same function as that of the ReLU activation layer in the first fully connected network layer. The third fully connected network layer has 1024 output dimensions and 4096×1024 computing units. Likewise, the third fully connected network layer is also followed by a third activation layer, which has the same function as that of the ReLU activation layer in the first fully connected network layer. Finally, each regression network further includes an output layer. A linear function is used in the output layer to output an enhanced parameter obtained in a corresponding regression network. The output layer may also be a fully connected network layer. As shown in FIG. 5, the output layer in the target generation model may refer to a fourth fully connected network layer with 1 output dimension and corresponding to 1024×1 computing units, which is used to output a predicted enhancement parameter in a corresponding regression network.

For example, obtaining an enhancement parameter in each image information dimension by using a regression network in the target generation model is described in detail by using an example of obtaining the brightness enhancement parameter corresponding to the reference video frame by using the first regression network. The computer device may output the target image feature to the first regression network, and weight the target image feature by using a weight matrix corresponding to a first fully connected network layer in the first regression network, to obtain a first output feature corresponding to the target image feature in the first fully connected network layer; activate the first output feature by using a first activation layer after the first fully connected network layer, to obtain an activated first output feature; weight the activated first output feature by using a weight matrix in a second fully connected network layer in the first regression network, to obtain a second output feature of the target image feature in the second fully connected network layer, and activate the second output feature by using a second activation function, to obtain an activated second output feature; weight the activated second output feature by using a weight matrix corresponding to a third fully connected network layer in the first regression network, to obtain a third output feature of the target image feature in the third fully connected network layer, and activate the third output feature by using a third activation layer, to obtain an activated third output feature; and perform linear combination on the activated third output feature by using an output layer (the output layer may be a fully connected network layer, namely, a fourth fully connected network layer) in the first regression network, to obtain the brightness enhancement parameter corresponding to the reference video frame. With this method, an enhancement parameter in each image information dimension may be obtained by using a regression network in the target generation model.

In step S205, perform, according to the M enhancement parameters, image enhancement on the video frames included in the target video frame set to obtain target image data corresponding to each video frame in the target video frame set.

For example, the computer device may determine the enhancement parameters of the reference video frame in the M image information dimensions as enhancement parameters corresponding to the target video frame set, and perform, according to the M enhancement parameters, image enhancement on the video frames included in the target video frame set to obtain target image data corresponding to each video frame in the target video frame set. In this way, the same set of enhancement parameters are used for video frames in the same video frame set. This can avoid visible color transition between video frames in the same scene. In addition, enhancement parameter prediction needs to be performed only once for one video frame set, thereby greatly reducing an amount of computation in video application and improving image processing efficiency.

In an example, the target video frame set includes a video frame $T_j$, where j is a positive integer less than or equal to a quantity of video frames included in the target video frame set, for example, a value of j may be 1, 2, 3, . . . . . For example, the enhancement parameters in the M image information dimensions include a brightness enhancement parameter, a contrast enhancement parameter, and a saturation enhancement parameter. A manner of obtaining, by the computer device, the target image data corresponding to each video frame in the target video frame set may include: determining a product of the brightness enhancement parameter and the video frame $T_j$ (for example, the video frame $T_j$ is multiplied by the brightness enhancement parameter) as a first candidate video frame corresponding to the video frame $T_j$; acquiring a global average pixel value corresponding to the first candidate video frame, and acquiring a first difference between a pixel value included in the first candidate video frame and the global average pixel value; determining, according to the global average pixel value and a product of the first difference and the contrast enhancement parameter, a second candidate video frame corresponding to the video frame $T_j$; and acquiring a channel average pixel value corresponding to the second candidate video frame, acquiring a second difference between a pixel value included in the second candidate video frame and the channel average pixel value, and determining, according to the channel average pixel value and a product of the second difference and the saturation enhancement parameter, target image data corresponding to the video frame $T_j$.

For example, after acquiring the brightness enhancement parameter, the contrast enhancement parameter, and the saturation enhancement parameter that correspond to the target video frame, the computer device may determine a product of the brightness enhancement parameter and the video frame $T_j$ as a first candidate video frame, that is, adjust image brightness information in the video frame $T_j$ according to the brightness enhancement parameter to obtain the first candidate video frame. The computer device may further acquire a global average pixel value corresponding to the first candidate video frame, and acquire a first difference between a pixel value included in the first candidate video frame and the global average pixel value. The global average pixel value is an average pixel value obtained by averaging pixel values corresponding to all pixels included in the first candidate video frame. Therefore, during the acquisition of the first difference between the pixel value included in the first candidate video frame and the global average pixel value, a difference between a pixel value corresponding to each pixel included in the first candidate video frame and the global average pixel value may be calculated, where one pixel corresponds to one first difference. After obtaining the first difference, the computer device may acquire a product of the first difference and the contrast enhancement parameter, and determine a sum of the global average pixel value and the product of the first difference and the contrast enhancement parameter as a second candidate video frame corresponding to video frame $T_j$. After obtaining the second candidate video frame corresponding to the video frame $T_j$, the computer device may acquire a channel average pixel value corresponding to the second candidate video frame, and acquire a second difference between a pixel value included in the second candidate video frame and the channel average pixel value. Each image includes pixel values in three channels. The channel average pixel value refers to a channel average pixel value, in a target channel, that is obtained by averaging pixels in the three channels. An image corresponding to the second candidate video frame also includes pixel values in three channels. Therefore, the acquiring a second difference between a pixel value included in the second candidate video frame and the channel average pixel value may mean: calculating a difference between a pixel value in each channel included in the second candidate video frame and the channel average pixel value in the target channel, where one pixel in the second candidate video frame corresponds to one second difference. After obtaining the second difference, the computer device may acquire a product of the second difference and the saturation enhancement parameter, and determine a sum of the channel average pixel value and the product of the second difference and the saturation enhancement parameter as target image data corresponding to the video frame $T_j$.

For example, a formula for determining, by the computer device according to the brightness enhancement parameter, the first candidate video frame corresponding to the video frame $T_j$ may be expressed by using a formula (1):

$$I_1 = b \times I_{in} \tag{1}$$

In the formula (1), $I_1$ indicates the first candidate video frame, b indicates the brightness enhancement parameter, and $I_{in}$ indicates the video frame $T_j$.

For example, a formula for determining, by the computer device according to the contrast enhancement parameter, the second candidate video frame corresponding to the video frame $T_j$ may be expressed by using a formula (2):

$$I_2 = c \times (I_1 - \text{mean}(I_1)) + \text{mean}(I_1) \tag{2}$$

In the formula (2), $I_2$ indicates an input image (namely, the second candidate video frame), c indicates the contrast enhancement parameter, $I_1$ indicates the first candidate video frame, and $\text{mean}(I_1)$ indicates a mean function for acquiring the global average pixel value corresponding to the first candidate video frame.

For example, a formula for determining, by the computer device according to the saturation enhancement parameter, the target image data corresponding to the video frame $T_j$ may be expressed by using a formula (3):

$$I_{out} = s \times (I_2 - \text{channel\_mean}(I_2)) + \text{channel\_mean}(I_2) \tag{3}$$

In the formula (3), $I_{out}$ indicates an output image (namely, the target image data corresponding to video frame $T_j$), s indicates the saturation enhancement parameter, $I_2$ indicates an input image (namely, the second candidate video frame), and $\text{channel\_mean}(I_2)$ indicates a function for acquiring the channel average pixel value corresponding to the second candidate video frame.

In an example, before the foregoing target generation model is used, the target generation model further needs to be trained. The following describes a training process of the target generation model in detail by using FIG. 6 to FIG. 8.

For example, the computer device may acquire a sample video frame and label information corresponding to the sample video frame, where the sample video frame is obtained by performing a random degradation operation on a color of the reference video frame, and the label information is determined according to a coefficient of the random degradation operation; input, to an initial generation model, a sample global color feature and a sample image semantic feature that correspond to the sample video frame, process the sample global color feature and the sample image semantic feature by using the initial generation model, and output a predicted enhancement parameter corresponding to the sample video frame; and determine, according to the label information corresponding to the sample video frame and the predicted enhancement parameter corresponding to the sample video frame, a loss function corresponding to the initial generation model, perform iterative training on the initial generation model according to the loss function, and in a case that the initial generation model meets a convergence condition, determine the initial generation model meeting the convergence condition as the target generation model.

The computer device may train the initial generation model according to a requirement to obtain the target generation model, for example, generate a target generation model for predicting a brightness enhancement parameter, a contrast enhancement parameter, and a saturation enhancement parameter that correspond to a video frame. During the acquisition of the label information corresponding to the sample video frame, the computer device may acquire a batch of high-quality color images, a random color degradation operation is manually performed on the images, and a coefficient of the random degradation operation is stored. A color-degraded image is used as the sample video frame, and the coefficient of the random degradation operation is determined as the label information corresponding to the sample video frame. A parameter in a fully connected network layer of a candidate generation model is randomly initialized to obtain the initial generation model. Feature extraction is performed, by using a fully connected network layer in the initial generation model, on the sample global color feature and the sample image semantic feature that correspond to the sample video frame, and the predicted enhancement parameter corresponding to the sample video frame is outputted. The loss function corresponding to the initial generation model is determined according to a difference between the label information corresponding to the sample video frame and the predicted enhancement parameter corresponding to the sample video frame, iterative training is performed on the initial generation model according to the loss function, and in a case that the initial generation model meets the convergence condition, the initial generation model meeting the convergence condition is determined as the target generation model.

The convergence condition corresponding to the initial generation model may be that a loss value of the loss function corresponding to the initial generation model is less than a loss threshold, the loss value is a minimum value of the loss function corresponding to the initial generation model, a quantity of times of training of the initial generation model reaches a times threshold, or the like. For example, when the loss value of the loss function corresponding to the initial generation model is less than the loss threshold, it is determined that the initial generation model meets the convergence condition, and the initial generation model meeting the convergence condition is determined as the target generation model. When the loss value of the loss function corresponding to the initial generation model is greater than or equal to the loss threshold, it is determined that the initial generation model does not meet the convergence condition, a network parameter in the initial generation model may be adjusted according to the loss value until the initial generation model meets the convergence condition. For example, during the adjustment of the network parameter in the initial generation model according to the loss value, a loss degree to which the loss value belongs may be determined, and the network parameter in the initial generation model may be adjusted according to the loss degree to which the loss value belongs. For example, when it is determined that the loss degree of the loss value is greater than or equal to the loss threshold, it may be determined that a loss of the initial generation model is large, that is, a difference between the predicted enhancement parameter outputted by the initial generation model and a manually marked enhancement parameter is large. In this case, the network parameter in the initial generation model may be adjusted to a greater extent. When it is determined that the loss degree of the loss value is less than the loss threshold, it may be determined that a loss of the initial generation model is small, that is, a difference between the predicted enhancement parameter outputted by the initial generation model and a manually marked enhancement parameter is small. In this case, the network parameter in the initial generation model may be adjusted to a smaller extent. In this way, the network parameter in the initial generation model is adjusted based on the loss value, so that adjustment can be performed to a greater extent when a degree of a prediction error of the initial generation model is larger, thereby increasing a convergence speed of the initial generation model and improving training efficiency. In addition, an adjustment operation performed on the initial generation model is more accurate, thereby improving training precision for the initial generation model.

Feature extraction is performed, by using the target generation model, on the global color feature and the image semantic feature that correspond to the reference video frame, to obtain enhancement parameters of the reference video frame in a brightness information dimension, a contrast information dimension, and a saturation information dimension. A network structure of the target generation model may be a fully connected network structure. During the training of the initial generation model, training and convergence directions of the initial generation model are supervised according to manually marked label information, so that a training effect is stable and reliable. In addition, with the manually marked label information, monitoring on a parameter adjustment range of the initial generation model is highly controllable, so that a prediction effect corresponding to a finally obtained target generation model is stable.

In an example, during the training of the initial generation model, a pre-trained feature extraction model may be acquired, and a sample image semantic feature corresponding to each sample video frame may be output by using the feature extraction model. Further, a sample global color feature may be calculated according to a color histogram corresponding to the sample video frame. The sample image semantic feature and the sample global color feature are used as input information of the initial generation model, and a predicted enhancement parameter may be output by using the initial generation model. A loss function corresponding to the initial generation model is calculated by using a difference between label information corresponding to the sample video frame and the predicted enhancement parameter. The network parameter in the initial generation model is rectified according to the loss function, to obtain a trained target generation model. In other words, the initial generation model may be trained based on the trained feature extraction model, thereby improving training efficiency of the initial generation model.

In an example, the feature extraction model may be trained during the training of the initial generation model. The computer device may acquire an initialized feature extraction model (for ease of description, the initialized feature extraction model may be referred to as an initial feature extraction model), input an acquired sample video frame to the initial feature extraction model, and output, by using the initial feature extraction model, a sample image semantic feature corresponding to the sample video frame; may further input, to the initial generation model, the sample image semantic feature and a sample global color feature corresponding to the sample video frame, and output a predicted enhancement parameter by using the initial generation model; may calculate, according to the sample image semantic feature, the predicted enhancement parameter, and label information corresponding to the sample video frame, a total loss function corresponding to both the initial feature extraction model and the initial generation model, perform iterative training on network parameters in the initial feature extraction model and the initial generation model according to the total loss function, and in a case that the initial feature extraction model and the initial generation model meet a convergence condition, determine the initial feature extraction model meeting the convergence condition as the feature extraction model, and determine the initial generation model meeting the convergence condition as the target generation model. A computing process of outputting, by using the initial feature extraction model, the sample image semantic feature corresponding to the sample video frame is similar to the computing process of the foregoing image semantic feature. Refer to the content of step S102 in FIG. 3. This is not described herein again in this embodiment of this disclosure. In this solution, image enhancement may be performed on video data by using the feature extraction model and the target generation model, to obtain target image data corresponding to the video data.

Figure 6:
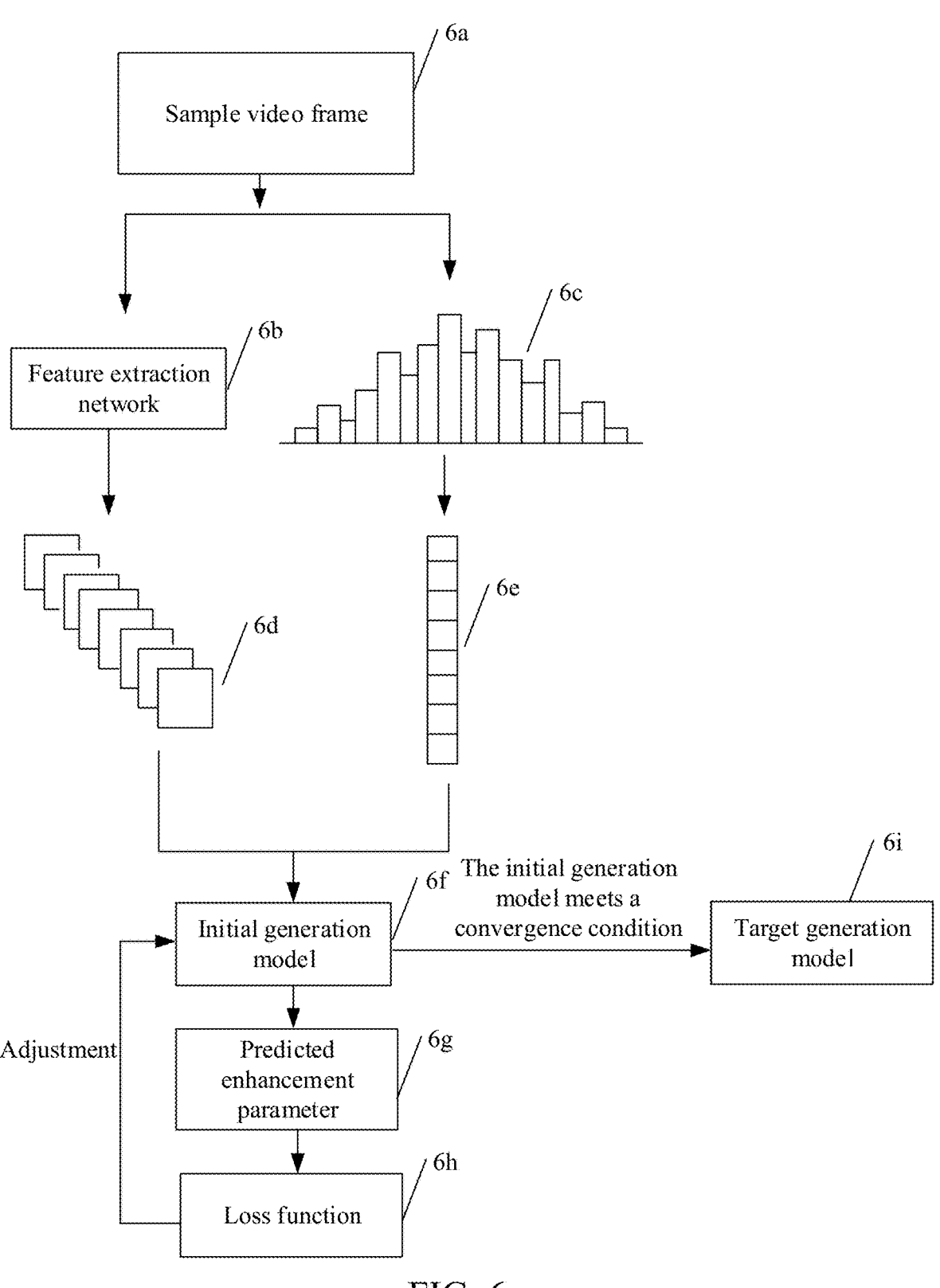
FIG. 6 is a schematic diagram of generating a target generation model according to an embodiment of this disclosure.

FIG. 6 is a schematic diagram of generating a target generation model according to an embodiment of this disclosure. As shown in FIG. 6, a computer device may acquire high-quality image data from a batch of high-quality image libraries, perform color adjustment (for example, color degradation or color enhancement) on the high-quality image data, determine color-adjusted image data as a sample video frame 6a, and acquire, according to a color adjustment coefficient of the high-quality image data, label information corresponding to the sample video frame. After obtaining the sample video frame, the computer device may perform image semantic feature extraction on the sample video frame 6a by using a feature extraction network 6b, to obtain a sample image semantic feature 6d corresponding to the sample video frame 6a, and acquire, by acquiring a color histogram 6c corresponding to the sample video frame 6a, a sample global color feature 6e corresponding to the sample video frame 6a; input, to an initial generation model 6f, the sample image semantic feature 6d and the sample global color feature 6e that correspond to sample video frame 6a, and generate, by using the initial generation model 6f, a predicted enhancement parameter 6g corresponding to the sample video frame 6a; and determine, according to the predicted enhancement parameter outputted by the initial generation model 6f and the label information corresponding to the sample video frame 6a, a loss function 6h corresponding to the initial generation model 6f, adjust a parameter of the initial generation model 6f according to the loss function 6h, and in a case that the initial generation model 6f meets a convergence condition, determine the initial generation model 6f meeting the convergence condition as a target generation model 6i. The convergence condition corresponding to the initial generation model 6f may be that a loss value of the loss function corresponding to the initial generation model 6f is less than a loss threshold, the loss value is a minimum value of the loss function corresponding to the initial generation model 6f, a quantity of times of training of the initial generation model 6f reaches a times threshold, or the like. For example, when the loss value of the loss function corresponding to the initial generation model 6f is less than the loss threshold, it is determined that the initial generation model 6f meets the convergence condition, and the initial generation model 6f meeting the convergence condition is determined as the target generation model. When the loss value of the loss function corresponding to the initial generation model 6f is greater than or equal to the loss threshold, a network parameter in the initial generation model 6f is adjusted according to the loss value until the initial generation model 6f meets the convergence condition.

FIG. 7 is a schematic diagram of a predicted enhancement parameter corresponding to a target generation model according to an embodiment of this disclosure. As shown in FIG. 7, enhancement parameter prediction is performed on a reference video frame by using a target generation model, to obtain a comparison diagram of a labeled value and each of a predicted brightness enhancement parameter, a predicted contrast enhancement parameter, and a predicted saturation enhancement parameter that correspond to the reference video frame. As shown in FIG. 7, in a comparison diagram corresponding to predicted brightness enhancement parameters and labeled brightness values, it can be learned that labeled values are surrounded by predicted brightness enhancement parameters that respectively correspond to video frames in video data and that are obtained by using the target generation model, a mean of the predicted brightness enhancement parameters corresponding to the video frames is quite close to a mean of the labeled values, and a variance is also within an acceptable threshold range. Likewise, in a comparison diagram corresponding to predicted contrast enhancement parameters and labeled contrast values, labeled values are surrounded by predicted contrast enhancement parameters that respectively correspond to the video frames in the video data and that are obtained by using the target generation model, a mean of the predicted contrast enhancement parameters corresponding to the video frames is quite close to a mean of the labeled values, and a variance is also within an acceptable threshold range. Likewise, in a comparison diagram corresponding to predicted saturation enhancement parameters and labeled saturation values, labeled values are surrounded by predicted saturation enhancement parameters that respectively correspond to the video frames in the video data and that are obtained by using the target generation model, a mean of the predicted saturation enhancement parameters corresponding to the video frames is quite close to a mean of the labeled values, and a variance is also within an acceptable threshold range.

Figure 8:
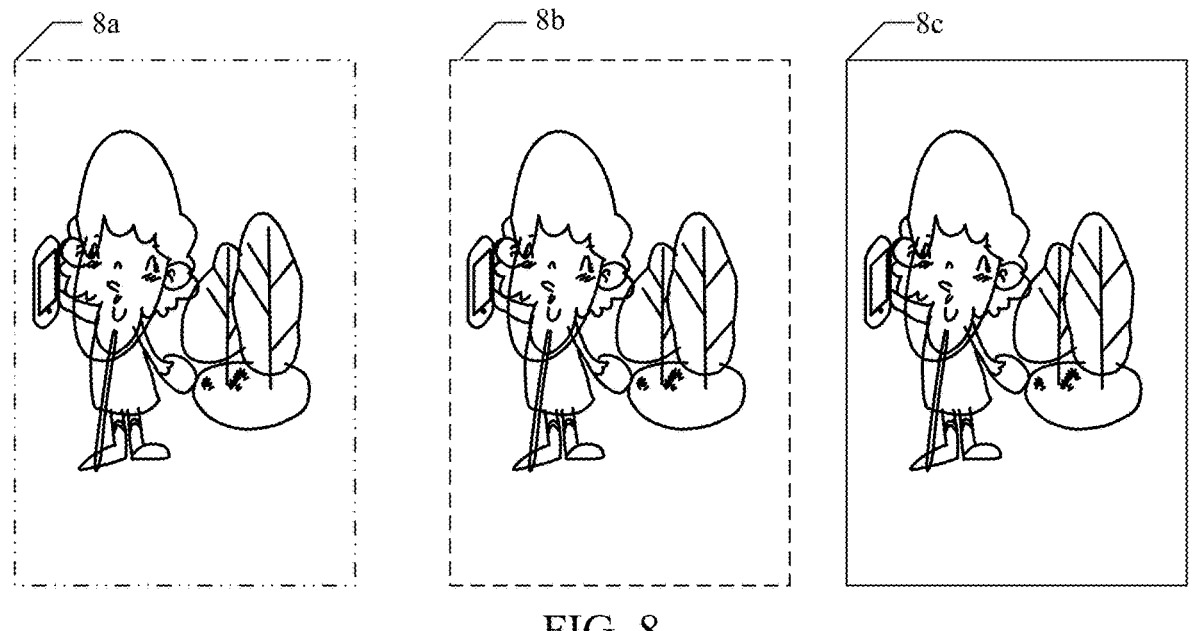
FIG. 8 is a schematic diagram of comparison between a reference video frame and corresponding target image data according to an embodiment of this disclosure.

FIG. 8 is a schematic diagram of comparison between a reference video frame and corresponding target image data according to an embodiment of this disclosure. As shown in FIG. 8, an image 8a is a reference image, and a manually labeled value corresponding to the reference image is 0.76, that is, a target image needs to be obtained by using a target generation model. An image 8b is a to-be-processed image, that is, an original image on which image enhancement needs to be performed. An image 8c is a target image, that is, a target image obtained by performing image enhancement on the to-be-processed image. A predicted value corresponding to the image 8c is 0.9. Compared with the reference image 8a, the original image 8c can achieve a better image enhancement effect. This is because a predicted value of an image enhancement parameter is an accurate threshold obtained through fitting with reference to a large number of different types of high-quality color images, and therefore a target image obtained through image enhancement may have a better effect than a reference image. In this embodiment of this disclosure, a display effect of a to-be-processed image can be improved through image enhancement on the to-be-processed image.

After a trained target generation model is obtained through the foregoing training on the initial generation model, the target generation model may be applied in scenarios such as a live video enhancement application scenario, an on-demand video enhancement application scenario, and an image optimization application scenario.

Figure 9:
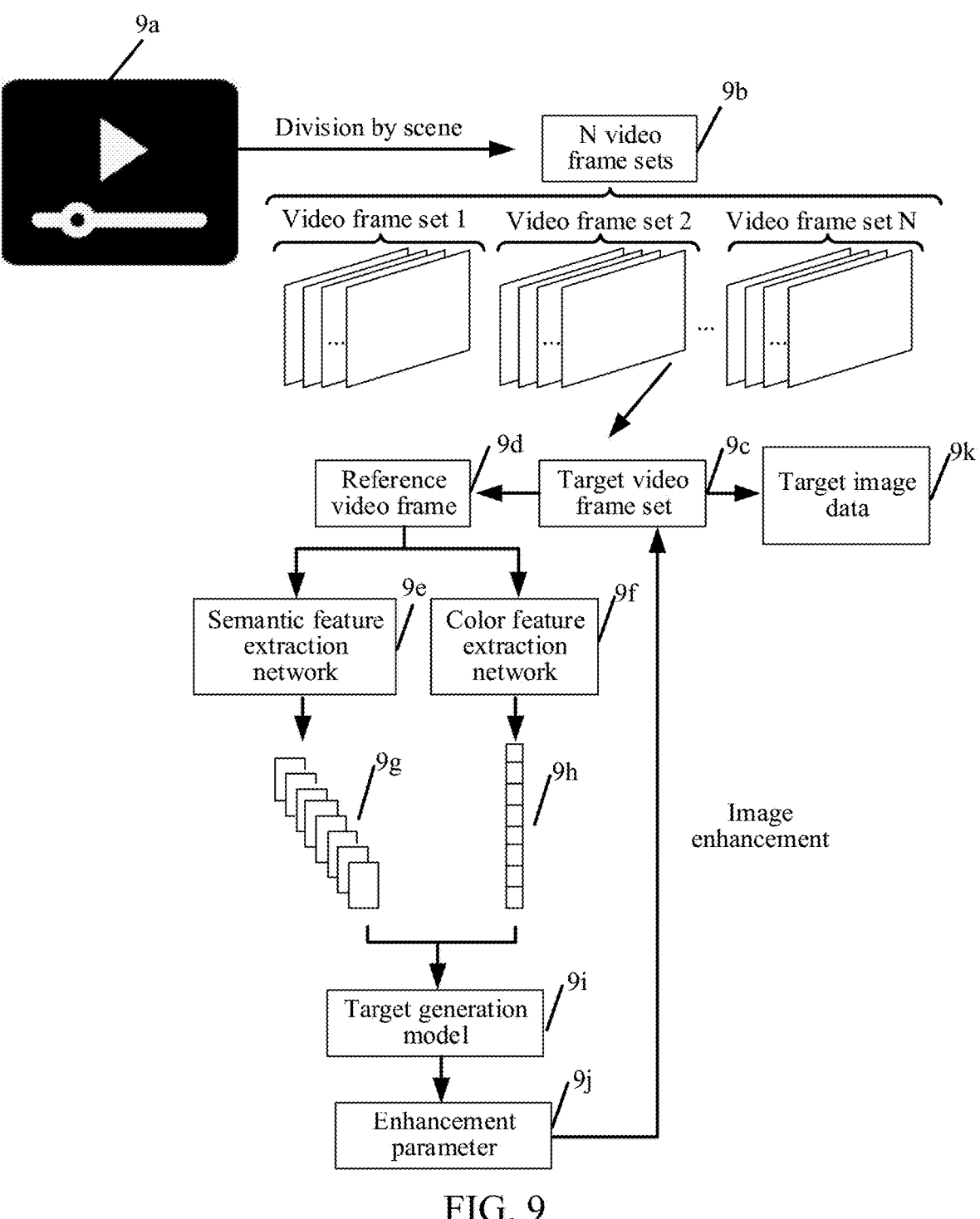
FIG. 9 is a schematic diagram of a video image processing scenario according to an embodiment of this disclosure.

FIG. 9 is a schematic diagram of a video image processing scenario according to an embodiment of this disclosure. As shown in FIG. 9, after a user A obtains user video data 9a through photographing, when the user A wants to upload the user video data 9a to a short video sharing platform to share a life video to others, the user A may upload the user video data 9a to the user terminal A1 for image enhancement provided in this disclosure, to perform image enhancement on the user video data 9a obtained by the user A through photographing, and improve video quality corresponding to the user video data 9a, so as to reduce problems such as dim light of an image or overexposure of an image in the user video data 9a, and improve visual experience of a user. The user terminal A1 acquires the user video data 9a, and may divide the user video data 9a by scene to obtain N video frame sets 9b, where N is a positive integer. The N video frame sets 9b include a video frame set 1, a video frame set 2, . . . , and a video frame set N. Each video frame set includes one or more video frames. For a division manner, refer to the content of step S101 in FIG. 3. This is not described herein again in this embodiment of this disclosure.

Further, when the user terminal A1 divides the video data to obtain the N video frame sets, the user terminal A1 may label the N video frame sets by using sequential identifiers, for example, may label the N video frame sets by using 1, 2, 3, . . . , or a, b, c, . . . , to obtain the video frame set 1, the video frame set 2, . . . , and the video frame set N. The user terminal A1 may sequentially perform image process- ing on the N video frame sets according to a sequence of the identifiers of the video frame sets. For example, a target video frame set 9c is used as an example. The target video frame set 9c may be any one of the N video frame sets. A video frame is randomly selected from video frames included in the target video frame set 9c as a reference video frame 9d. The reference video frame 9d is input to a semantic extraction network 9e, and image semantic feature extraction is performed on the reference video frame 9d to obtain an image semantic feature 9g corresponding to the reference video frame 9d. The reference video frame 9d is input to a color feature extraction network 9f to obtain a color histogram corresponding to the reference video frame 9d, and a global color feature 9h corresponding to the reference video frame 9d is acquired according to the color histogram corresponding to the reference video frame 9d. For content about how to acquire the color histogram corresponding to the reference video frame 9d and how to acquire the image semantic feature 9g corresponding to the reference video frame 9d, refer to the content of step S101 in FIG. 3. Details are not described herein again in this embodiment of this disclosure. After obtaining the global color feature 9h and the image semantic feature 9g that correspond to the reference video frame 9d, the user terminal A1 may input the global color feature 9h and the image semantic feature 9g to a target generation model 9i, and generate, by using the target generation model 9i, an enhancement parameter 9j corresponding to the reference video frame 9d. For structural content of the target genera- tion model, refer to the content of step S204 in FIG. 4. Details are not described herein again in this embodiment of this disclosure.

After obtaining the enhancement parameter 9j corre- sponding to the reference video frame 9d, the user terminal A1 may determine the enhancement parameter 9j corre- sponding to the reference video frame 9d as an enhancement parameter corresponding to the target video frame set 9c, and perform image enhancement on a video frame included in the target video frame set 9c, to obtain target image data 9k corresponding to each video frame in the target video frame set 9c. In this way, an enhancement parameter is acquired only once for one video frame set, that is, an enhancement parameter corresponding to a video frame in a video frame set is determined as an enhancement parameter of the corresponding video frame set, thereby improving computing efficiency and image enhancement efficiency. In this way, target image data corresponding to each video frame in the N video frame sets 9b is acquired by using the foregoing method for performing image enhancement on the video frames in the target video frame set, so as to obtain target image data corresponding to the user video data 9a. After the user terminal A1 performs image enhancement on the user video data 9a corresponding to the user A to obtain the target image data corresponding to the user video data 9a, the user may store the target image data corresponding to the user video data 9a, and may upload the target image data corresponding to the user video data 9a to a short video platform to which the user wants to upload the data. It can be learned that, in this embodiment of this disclosure, image enhancement may be performed on user video data, to resolve problems such as poor quality (for example, over- exposure or excessively dim light) of a recorded video due to improper operations performed by a user, and improve video quality of the user video data, so as to improve visual experience of a user and achieve high image enhancement efficiency.

In this embodiment of this disclosure, the video data may be divided according to the color histogram corresponding to each video frame, to obtain the N video frame sets, where video frames included in each video frame set have the same specified type attribute. This can ensure consistency of the division of the video data, that is, ensure that video frames included in each video frame set have the same attribute (for example, all video frames in the same video frame set belong to the same scene image). In this way, during acquisition of an enhancement parameter of each video frame set, a video frame may be directly randomly acquired from each video frame set as a reference video frame, enhancement parameters of the reference video frame in M image information dimensions are acquired according to a global color feature and an image semantic feature that correspond to the reference video frame, the enhancement parameters are used as enhancement parameters correspond- ing to a corresponding video frame set, and image enhance- ment is separately performed on video frames included in the video frame set to obtain target image data correspond- ing to each video frame in each video frame set. It can be learned that an enhancement parameter needs to be acquired only for one or some of video frames in a video frame set, and the enhancement parameter corresponding to the video frame may be determined as an enhancement parameter of the corresponding video frame set, thereby reducing an amount of computation and improving image enhancement efficiency. In addition, the same set of enhancement param- eters may be used for video frames having the same speci- fied type attribute. This can reduce a risk of color transition of an image, thereby improving enhancement quality of video data. In addition, in this embodiment of this disclo- sure, an enhancement parameter corresponding to the ref- erence video frame is acquired by using a fully connected regression network according to the global color feature and the image semantic feature that correspond to the reference video frame, and image enhancement is performed on each video frame in the target video frame set according to the enhancement parameter, to obtain target image data corre- sponding to each video frame in the target video frame set. An image enhancement effect is stable and controllable, and image enhancement efficiency is high.

Figure 10:
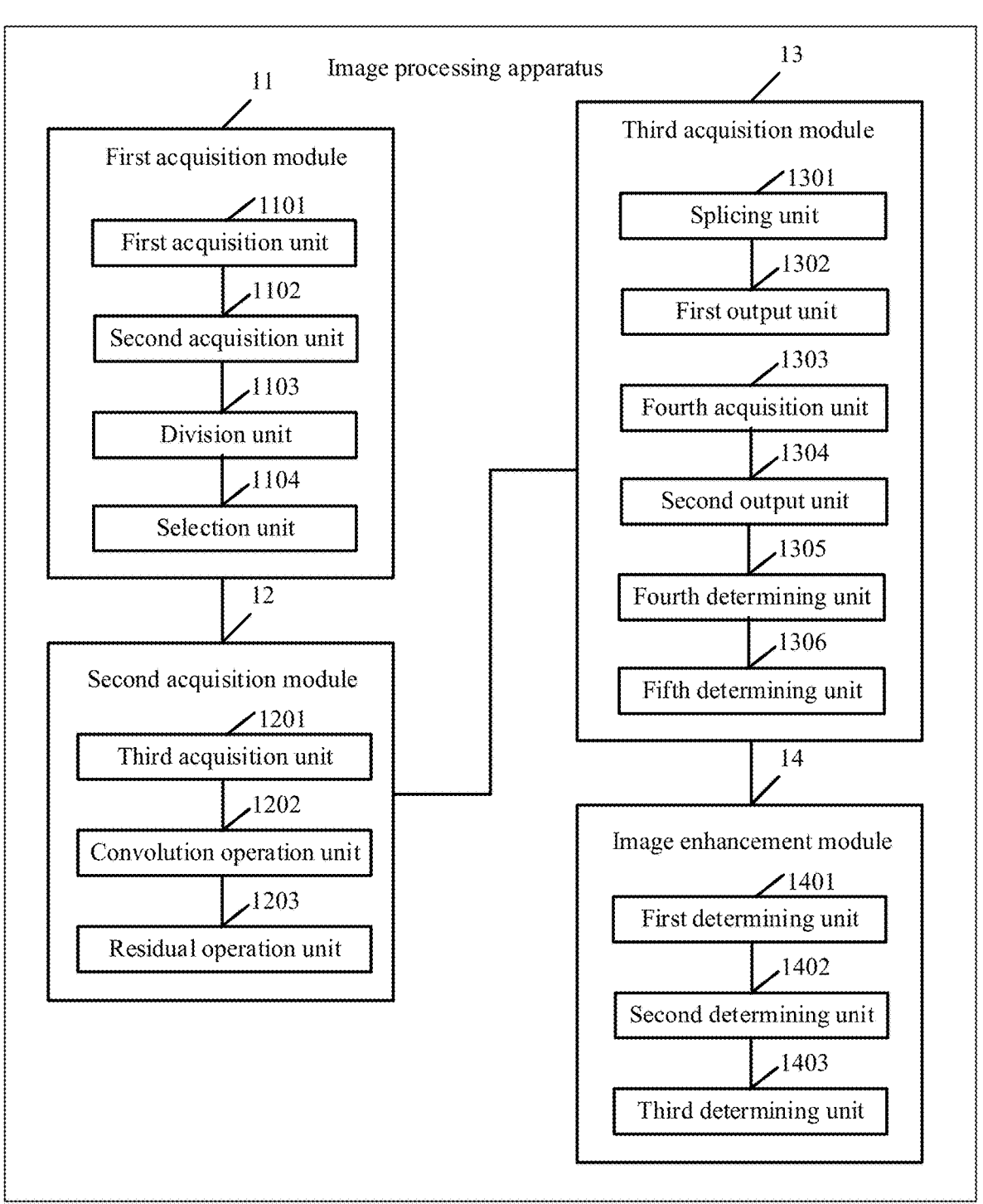
FIG. 10 is a schematic structural diagram of an image processing apparatus according to an embodiment of this disclosure.

FIG. 10 is a schematic structural diagram of an image processing apparatus according to an embodiment of this disclosure. As shown in FIG. 10, the image processing apparatus may be a client applied in a computer device, for example, any user terminal in the user terminal cluster shown in FIG. 1. The client may be a computer program (including program code) on the computer device. The image processing apparatus may include: a first acquisition module 11, a second acquisition module 12, a third acqui- sition module 13, and an image enhancement module 14. One or more modules, submodules, and/or units of the apparatus can be implemented by processing circuitry, software, or a combination thereof, for example.

The first acquisition module 11 is configured to acquire a target video frame set from video data, where video frames included in the target video frame set have the same specified type attribute.

The second acquisition module 12 is configured to acquire a global color feature corresponding to a reference video frame, and acquire an image semantic feature corresponding to the reference video frame, where the reference video frame is any video frame in the target video frame set.

The third acquisition module 13 is configured to acquire, according to the global color feature and the image semantic feature, enhancement parameters of the reference video frame in M image information dimensions, where M is a positive integer.

The image enhancement module 14 is configured to perform, according to the M enhancement parameters, image enhancement on the video frames included in the target video frame set to obtain target image data corresponding to each video frame in the target video frame set.

The specified type attribute includes a scene attribute.

The first acquisition module 11 includes:

a first acquisition unit 1101, configured to acquire the video data, divide the video data into L video frames, and acquire a color histogram corresponding to each of the L video frames;

a second acquisition unit 1102, configured to acquire a similarity distance between every two adjacent video frames in the L video frames according to the color histogram corresponding to each of the L video frames;

a division unit 1103, configured to divide the L video frames according to the similarity distance to obtain N video frame sets, where the similarity distance between every two adjacent video frames in the target video frame set is less than a distance threshold, and N is a positive integer; and a selection unit 1104, configured to select any video frame set from the N video frame sets as the target video frame set.

The first acquisition unit 1101 is configured to:

count, according to a color space to which pixels in the first video frame belong, a pixel quantity of pixels included in each of the P image color ranges, where the first video frame is any one of the L video frames, the P image color ranges are obtained by dividing the color space, and P is an integer greater than or equal to 2; and generate, according to the pixel quantity corresponding to each of the P image color ranges, a color histogram corresponding to the first video frame.

The second acquisition module 12 includes:

a third acquisition unit 1201, configured to adjust a size of the reference video frame to obtain a candidate video frame with a target size, and acquire, according to a color histogram corresponding to the candidate video frame, the global color feature corresponding to the reference video frame;

a convolution operation unit 1202, configured to input the reference video frame to a feature extraction model, and perform a convolution operation on the reference video frame by using a convolutional layer in the feature extraction model, to obtain an image convolution feature corresponding to the reference video frame; and a residual operation unit 1203, configured to perform a residual operation on the image convolution feature by using a residual layer in the feature extraction model, to obtain the image semantic feature corresponding to the reference video frame.

The third acquisition module 13 includes:

a splicing unit 1301, configured to splice the global color feature and the image semantic feature to obtain a target image feature; and a first output unit 1302, configured to input the target image feature to a target generation model, process the target image feature by using the target generation model, and output enhancement parameters of the target image feature in M image information dimensions, where the enhancement parameters in the M image information dimensions include at least one of a brightness enhancement parameter, a contrast enhancement parameter, and a saturation enhancement parameter.

The first output unit 1302 is configured to:

in response to that the enhancement parameters in the M image information dimensions include the brightness enhancement parameter, input the target image feature to the target generation model, and weight the target image feature by using a weight matrix corresponding to a first regression network in the target generation model, to obtain a brightness enhancement parameter corresponding to the reference video frame;

in response to that the enhancement parameters in the M image information dimensions include the contrast enhancement parameter, weight the target image feature by using a weight matrix corresponding to a second regression network in the target generation model, to obtain a contrast enhancement parameter corresponding to the reference video frame; and in response to that the enhancement parameters in the M image information dimensions include the saturation enhancement parameter, weight the target image feature by using a weight matrix corresponding to a third regression network in the target generation model, to obtain a saturation enhancement parameter corresponding to the reference video frame.

The target video frame set includes a video frame $T_j$, where j is a positive integer less than or equal to a quantity of video frames included in the target video frame set.

In response to that the enhancement parameters in the M image information dimensions include the brightness enhancement parameter, the contrast enhancement parameter, and the saturation enhancement parameter, the image enhancement module 14 includes:

a first determining unit 1401, configured to multiply the video frame $T_j$ by the brightness enhancement parameter to determine a first candidate video frame corresponding to the video frame $T_j$;

a second determining unit 1402, configured to acquire a global average pixel value corresponding to the first candidate video frame, acquire a first difference between a pixel value included in the first candidate video frame and the global average pixel value, and determine, according to the global average pixel value and a product of the first difference and the contrast enhancement parameter, a second candidate video frame corresponding to the video frame $T_j$; and a third determining unit 1403, configured to acquire a channel average pixel value corresponding to the second candidate video frame, acquire a second difference between a pixel value included in the second candidate video frame and the channel average pixel value, and determine, according to the channel average pixel value and a product of the second difference and the saturation enhancement parameter, target image data corresponding to the video frame $T_j$.

The third acquisition module 13 further includes:

a fourth acquisition unit 1303, configured to acquire a sample video frame and label information corresponding to the sample video frame, where the sample video frame is obtained by performing a random degradation operation on a color of the reference video frame, and the label information is determined according to a coefficient of the random degradation operation;

a second output unit 1304, configured to input, to an initial generation model, a sample global color feature and a sample image semantic feature that correspond to the sample video frame, process, by using the initial generation model, the sample global color feature and the sample image semantic feature that correspond to the sample video frame, and output a predicted enhancement parameter corresponding to the sample video frame;

a fourth determining unit 1305, configured to determine, according to the label information corresponding to the sample video frame and the predicted enhancement parameter corresponding to the sample video frame, a loss function corresponding to the initial generation model; and a fifth determining unit 1306, configured to perform iterative training on the initial generation model according to the loss function, and in a case that the initial generation model meets a convergence condition, determine the initial generation model meeting the convergence condition as the target generation model.

According to an embodiment of this disclosure, the steps included in the image processing method shown in FIG. 3 may be performed by the modules in the image processing apparatus shown in FIG. 10. For example, step S101 shown in FIG. 3 may be performed by the first acquisition module 11 shown in FIG. 10, step S102 shown in FIG. 3 may be performed by the second acquisition module 12 shown in FIG. 10, step S103 shown in FIG. 3 may be performed by the third acquisition module 13 shown in FIG. 10, and step S104 shown in FIG. 3 may be performed by the image enhancement module 14 shown in FIG. 10.

According to an embodiment of this disclosure, the modules in the image processing apparatus shown in FIG. 10 may be separately or wholly combined into one or several units, or one (or more) of the units herein may be further divided into a plurality of subunits of smaller functions. In this way, the same operations can be implemented without affecting implementation of the technical effects of the embodiments of this disclosure. The foregoing modules are divided based on logical functions. During practical application, a function of one module may alternatively be implemented by a plurality of units, or functions of a plurality of modules are implemented by one unit. In another embodiment of this disclosure, the test apparatus may alternatively include another unit. During practical application, these functions may alternatively be cooperatively implemented by another unit and may be cooperatively implemented by a plurality of units.

In this embodiment of this disclosure, the video data may be divided according to the color histogram corresponding to each video frame, to obtain the N video frame sets, where video frames included in each video frame set have the same attribute. This can ensure consistency of the division of the video data, that is, ensure that video frames included in each video frame set have the same attribute (for example, all video frames in the same video frame set belong to the same scene image). In this way, during acquisition of an enhancement parameter of each video frame set, a video frame may be directly randomly acquired from each video frame set as a reference video frame, enhancement parameters of the reference video frame in M image information dimensions are acquired according to a global color feature and an image semantic feature that correspond to the reference video frame, the enhancement parameters are used as enhancement parameters corresponding to a corresponding video frame set, and image enhancement is separately performed on video frames included in the video frame set to obtain target image data corresponding to each video frame in each video frame set. It can be learned that an enhancement parameter needs to be acquired only for one video frame in a video frame set, and the enhancement parameter corresponding to the video frame may be determined as an enhancement parameter of the corresponding video frame set, thereby reducing an amount of computation and improving image enhancement efficiency. In addition, the same set of enhancement parameters may be used for video frames having the same attribute. This can reduce a risk of color transition of an image, thereby improving enhancement quality of video data. In addition, in this embodiment of this disclosure, an enhancement parameter corresponding to the reference video frame is acquired by using a fully connected regression network according to the global color feature and the image semantic feature that correspond to the reference video frame, and image enhancement is performed on each video frame in the target video frame set according to the enhancement parameter, to obtain target image data corresponding to each video frame in the target video frame set. An image enhancement effect is stable and controllable, and image enhancement efficiency is high.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 11:
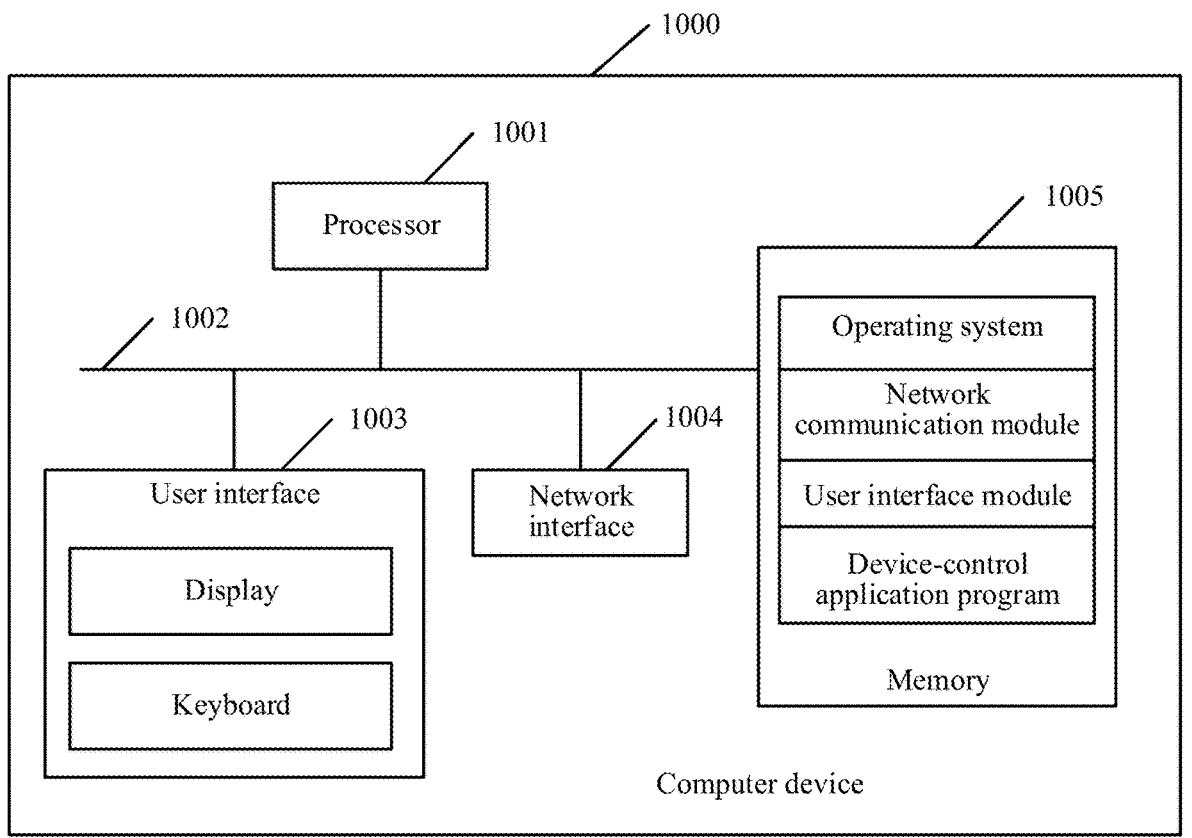
FIG. 11 is a schematic structural diagram of a computer device according to an embodiment of this disclosure.

FIG. 11 is a schematic structural diagram of a computer device according to an embodiment of this disclosure. As shown in FIG. 11, the computer device 1000 may include processing circuitry (e.g., a processor 1001), a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. In an example, the user interface 1003 may further include a wired interface and a wireless interface. In an example, the network interface 1004 may include a wired interface and a wireless interface (for example, a Wi-Fi interface). The memory 1005 may be a high-speed RAM memory, or may be a non-volatile memory, for example, at least one magnetic disk memory. In an example, the memory 1005 may alternatively be at least one storage apparatus located away from the processor 1001. As shown in FIG. 11, the memory 1005 used as a computer-readable storage medium may include an operating system, a network communication module, a user interface module, and a device-control application program.

In the computer device 1000 shown in FIG. 11, the network interface 1004 may provide a network communication function, the user interface 1003 is mainly configured to provide an input interface for a user, and the processor 1001 may be configured to invoke the device-control application program stored in the memory 1005 to implement all or some of the steps of the methods in the foregoing embodiments.

The computer device 1000 described in this embodiment of this disclosure may perform the descriptions of the image processing method in the embodiment corresponding to FIG. 3, or may perform the descriptions of the image processing apparatus in the embodiment corresponding to FIG. 10. Details are not described herein again. In addition, the descriptions of beneficial effects of the same method are not described herein again.

For technical details that are not disclosed in the computer-readable storage medium embodiments of this disclosure, refer to the descriptions of the method embodiments of this disclosure. In an example, program instructions may be deployed on one computing device for execution, or may be executed on a plurality of computing devices in one location, or may be executed on a plurality of computing devices that are distributed in a plurality of locations and that are interconnected through a communication network. The plurality of computing devices that are distributed in a plurality of locations and that are interconnected through a communication network may form a blockchain system.

In addition, an embodiment of this disclosure further provides a computer program product or a computer program, where the computer program product or the computer program may include computer instructions, and the computer instructions may be stored in a computer-readable storage medium. A processor of a computer device reads the computer instructions from the computer-readable storage medium, and the processor may execute the computer instructions, so that the computer device performs the descriptions of the image processing method in the embodiment corresponding to FIG. 3 or FIG. 4. Therefore, details are not described herein again. In addition, the descriptions of beneficial effects of the same method are not described herein again. For technical details that are not disclosed in the computer program product or computer program embodiments of this disclosure, refer to the descriptions of the method embodiments of this disclosure.

A person of ordinary skill in the art may understand that all or some of the processes of the methods in the foregoing embodiments may be implemented by a computer program instructing relevant hardware. The computer program may be stored in a computer-readable storage medium, such as a non-transitory computer-readable storage medium. When the program is run, the processes in the foregoing method embodiments may be included.

What is disclosed above is merely exemplary embodiments of this disclosure, and is not intended to limit the scope of the claims of this disclosure. Other embodiments shall fall within the scope of this disclosure.

What is claimed is:

1. An image processing method, comprising:
   acquiring a target video frame set from video data of a plurality of video frames, the target video frame set including a subset of the plurality of video frames that is selected based on characteristics of the subset of the plurality of video frames;

acquiring a global color feature of a reference video frame, the reference video frame being one of the subset of the plurality of video frames in the target video frame set;

acquiring an image semantic feature of the reference video frame;

acquiring an enhancement parameter of the reference video frame for each of a plurality of image information dimensions by splicing the global color feature and the image semantic feature, the enhancement parameter of the reference video frame for each of the plurality of image information dimensions including a brightness enhancement parameter, a contrast enhancement parameter, and a saturation enhancement parameter, each of the brightness enhancement parameter, the contrast enhancement parameter, and the saturation enhancement parameter being predicted by a respective regression network; and separately performing image enhancement on the plurality of video frames in the target video frame set according to each enhancement parameter of the reference video frame to obtain target image data for each of the plurality of video frames in the target video frame set, the target image data for a first video frame of the plurality of video frames being determined based on a product of (i) the saturation enhancement parameter and (ii) a second difference between a pixel value of a second candidate video frame and a channel average pixel value of the second candidate video frame, the second candidate video frame being determined based on a product of (i) the contrast enhancement parameter and (ii) a first difference between a pixel value of a first candidate video frame and a global average pixel value of the first candidate video frame, and the first candidate video frame being determined based on a product of the first video frame and the brightness enhancement parameter.

2. The method according to claim 1, wherein the characteristics of the subset of the plurality of video frames correspond to a same scene attribute.

3. The method according to claim 1, wherein the acquiring the target video frame set comprises:
   acquiring a color histogram of each of the plurality of video frames of the video data;
   acquiring a similarity distance between each of adjacent video frames in the plurality of video frames of the video data according to the color histograms of the respective adjacent video frames;
   dividing the plurality of video frames into a plurality of video frame sets; and
   selecting the target video frame set from the plurality of video frame sets, the similarity distance between each of the adjacent video frames in the target video frame set being less than a distance threshold.

4. The method according to claim 3, wherein the acquiring the color histogram of each of the plurality of video frames of the video data comprises:
   counting, according to a color space of pixels in a video frame, a pixel quantity of pixels included in each of a plurality of image color ranges, the video frame being one of the plurality of video frames of the video data, the plurality of image color ranges being obtained by dividing the color space; and
   generating, according to the pixel quantity corresponding to each of the image color ranges, the color histogram corresponding to the video frame.

5. The method according to claim 1, wherein the acquiring the global color feature of the reference video frame comprises:

reducing a size of the reference video frame to obtain a candidate video frame with a target size, and acquiring, according to a color histogram corresponding to the candidate video frame, the global color feature of the reference video frame.

6. The method according to claim 1, wherein the acquiring the image semantic feature of the reference video frame comprises:

performing a convolution operation on the reference video frame by using a convolutional layer in a feature extraction model, to obtain an image convolution feature of the reference video frame; and performing a residual operation on the image convolution feature by using a residual layer in the feature extraction model, to obtain the image semantic feature of the reference video frame.

7. The method according to claim 1, wherein the acquiring the enhancement parameter of the reference video frame for each of the plurality of image information dimensions comprises:

splicing the global color feature and the image semantic feature to obtain a target image feature; and processing the target image feature by using a target generation model to predict the enhancement parameter of the target image feature for each of the plurality of image information dimensions.

8. The method according to claim 7, wherein when the enhancement parameter for each of the plurality of image information dimensions includes the brightness enhancement parameter, the target image feature is weighted by using a weight matrix corresponding to a first regression network in the target generation model, to obtain the brightness enhancement parameter of the reference video frame;

when the enhancement parameter for each of the plurality of image information dimensions includes the contrast enhancement parameter, the target image feature is weighted by using a weight matrix corresponding to a second regression network in the target generation model, to obtain the contrast enhancement parameter of the reference video frame; and when the enhancement parameter for each of the plurality of image information dimensions includes the saturation enhancement parameter, the target image feature is weighted by using a weight matrix corresponding to a third regression network in the target generation model, to obtain the saturation enhancement parameter of the reference video frame.

9. The method according to claim 8, wherein the separately performing includes:

multiplying the first video frame of the target video frame set by the brightness enhancement parameter to determine the first candidate video frame corresponding to the first video frame;

acquiring the global average pixel value corresponding to the first candidate video frame, acquiring the first difference between the pixel value in the first candidate video frame and the global average pixel value, and determining, according to the global average pixel value and the product of the first difference and the contrast enhancement parameter, the second candidate video frame corresponding to the first video frame; and acquiring the channel average pixel value corresponding to the second candidate video frame, acquiring the second difference between the pixel value in the second candidate video frame and the channel average pixel value, and determining, according to the channel average pixel value and the product of the second difference and the saturation enhancement parameter, the target image data corresponding to the first video frame.

10. The method according to claim 7, further comprising:

processing, by using an initial generation model, a sample global color feature and a sample image semantic feature of a sample video frame, and outputting a predicted enhancement parameter of the sample video frame, the sample video frame being obtained by performing a random degradation operation on a color of the reference video frame;

determining, according to label information of the sample video frame and the predicted enhancement parameter of the sample video frame, a loss function of the initial generation model, the label information being determined according to a coefficient of the random degradation operation; and performing iterative training on the initial generation model according to the loss function, and when the initial generation model meets a convergence condition, determining the initial generation model meeting the convergence condition as the target generation model.

11. An image processing apparatus, comprising:

processing circuitry configured to:

acquire a target video frame set from video data of a plurality of video frames, the target video frame set including a subset of the plurality of video frames that is selected based on characteristics of the subset of the plurality of video frames;

acquire a global color feature of a reference video frame, the reference video frame being one of the subset of the plurality of video frames in the target video frame set;

acquire an image semantic feature of the reference video frame;

acquire an enhancement parameter of the reference video frame for each of a plurality of image information dimensions by splicing the global color feature and the image semantic feature, the enhancement parameter of the reference video frame for each of the plurality of image information dimensions including a brightness enhancement parameter, a contrast enhancement parameter, and a saturation enhancement parameter, each of the brightness enhancement parameter, the contrast enhancement parameter, and the saturation enhancement parameter being predicted by a respective regression network; and separately perform image enhancement on the plurality of video frames in the target video frame set according to each enhancement parameter of the reference video frame to obtain target image data for each of the plurality of video frames in the target video frame set, the target image data for a first video frame of the plurality of video frames being determined based on a product of (i) the saturation enhancement parameter and (ii) a second difference between a pixel value of a second candidate video frame and a channel average pixel value of the second candidate video frame, the second candidate video frame being determined based on a product of (i) the contrast enhancement parameter and (ii) a first difference between a pixel value of a first candidate video frame and a global average pixel value of the first candidate video frame, and the first candidate video frame being determined based on a product of the first video frame and the brightness enhancement parameter.

12. The image processing apparatus according to claim 11, wherein the characteristics of the subset of the plurality of video frames correspond to a same scene attribute.

13. The image processing apparatus according to claim 11, wherein the processing circuitry is configured to:
acquire a color histogram of each of the plurality of video frames of the video data;
acquire a similarity distance between each of adjacent video frames in the plurality of video frames of the video data according to the color histograms of the respective adjacent video frames;
divide the plurality of video frames into a plurality of video frame sets; and
select the target video frame set from the plurality of video frame sets, the similarity distance between each of the adjacent video frames in the target video frame set being less than a distance threshold.

14. The image processing apparatus according to claim 13, wherein the processing circuitry is configured to:
count, according to a color space of pixels in a video frame, a pixel quantity of pixels included in each of a plurality of image color ranges, the video frame being one of the plurality of video frames of the video data, the plurality of image color ranges being obtained by dividing the color space; and
generate, according to the pixel quantity corresponding to each of the image color ranges, the color histogram corresponding to the video frame.

15. The image processing apparatus according to claim 11, wherein the processing circuitry is configured to:
reduce a size of the reference video frame to obtain a candidate video frame with a target size, and acquire, according to a color histogram corresponding to the candidate video frame, the global color feature of the reference video frame.

16. The image processing apparatus according to claim 11, wherein the processing circuitry is configured to:
perform a convolution operation on the reference video frame by using a convolutional layer in a feature extraction model, to obtain an image convolution feature of the reference video frame; and
perform a residual operation on the image convolution feature by using a residual layer in the feature extraction model, to obtain the image semantic feature of the reference video frame.

17. The image processing apparatus according to claim 11, wherein the processing circuitry is configured to:
splice the global color feature and the image semantic feature to obtain a target image feature; and
process the target image feature by using a target generation model to predict the enhancement parameter of the target image feature for each of the plurality of image information dimensions.

18. The image processing apparatus according to claim 17, wherein
when the enhancement parameter for each of the plurality of image information dimensions includes the brightness enhancement parameter, the target image feature is weighted by using a weight matrix corresponding to a first regression network in the target generation model, to obtain the brightness enhancement parameter of the reference video frame;
when the enhancement parameter for each of the plurality of image information dimensions includes the contrast enhancement parameter, the target image feature is weighted by using a weight matrix corresponding to a second regression network in the target generation model, to obtain the contrast enhancement parameter of the reference video frame; and
when the enhancement parameter for each of the plurality of image information dimensions includes the saturation enhancement parameter, the target image feature is weighted by using a weight matrix corresponding to a third regression network in the target generation model, to obtain the saturation enhancement parameter of the reference video frame.

19. The image processing apparatus according to claim 18, wherein
the processing circuitry is configured to:
multiply the first video frame of the target video frame set by the brightness enhancement parameter to determine the first candidate video frame corresponding to the first video frame;
acquire the global average pixel value corresponding to the first candidate video frame, acquiring the first difference between the pixel value in the first candidate video frame and the global average pixel value, and determine, according to the global average pixel value and the product of the first difference and the contrast enhancement parameter, the second candidate video frame corresponding to the first video frame; and
acquire the channel average pixel value corresponding to the second candidate video frame, acquire the second difference between the pixel value in the second candidate video frame and the channel average pixel value, and determine, according to the channel average pixel value and the product of the second difference and the saturation enhancement parameter, the target image data corresponding to the first video frame.

20. A non-transitory computer-readable storage medium, storing instructions which when executed by a processor cause the processor to perform:
acquiring a target video frame set from video data of a plurality of video frames, the target video frame set including a subset of the plurality of video frames that is selected based on characteristics of the subset of the plurality of video frames;
acquiring a global color feature of a reference video frame, the reference video frame being one of the subset of the plurality of video frames in the target video frame set;
acquiring an image semantic feature of the reference video frame;
acquiring an enhancement parameter of the reference video frame for each of a plurality of image information dimensions by splicing the global color feature and the image semantic feature, the enhancement parameter of the reference video frame for each of the plurality of image information dimensions including a brightness enhancement parameter, a contrast enhancement parameter, and a saturation enhancement parameter, each of the brightness enhancement parameter, the contrast enhancement parameter, and the saturation enhancement parameter being predicted by a respective regression network; and separately performing image enhancement on the plurality of video frames in the target video frame set according to each enhancement parameter of the reference video frame to obtain target image data for each of the plurality of video frames in the target video frame set, the target image data for a first video frame of the plurality of video frames being determined based on a product of (i) the saturation enhancement parameter and (ii) a second difference between a pixel value of a second candidate video frame and a channel average pixel value of the second candidate video frame, the second candidate video frame being determined based on a product of (i) the contrast enhancement parameter and (ii) a first difference between a pixel value of a first candidate video frame and a global average pixel value of the first candidate video frame, and the first candidate video frame being determined based on a product of the first video frame and the brightness enhancement parameter.

* * * * *